(12) United States Patent
Zhao et al.

(10) Patent No.: US 8,051,324 B1
(45) Date of Patent: Nov. 1, 2011

(54) MASTER-SLAVE PROVIDER ARCHITECTURE AND FAILOVER MECHANISM

(75) Inventors: Oufei Zhao, Hopkinton, MA (US); Galen J. Bunnell, Westborough, MA (US); Matthew Norgren, Clinton, MA (US); Felix Rieper, Cambridge, MA (US)

(73) Assignee: EMC Corporation, Hopkinton, MA (US)

( * ) Notice: Subject to any disclaimer, the term of this patent is extended or adjusted under 35 U.S.C. 154(b) by 648 days.

(21) Appl. No.: 11/729,222

(22) Filed: Mar. 28, 2007

Related U.S. Application Data

(60) Provisional application No. 60/853,476, filed on Oct. 20, 2006.

(51) Int. Cl.
*G06F 11/00* (2006.01)

(52) U.S. Cl. .................. 714/11; 714/10; 702/182; 700/3

(58) Field of Classification Search .............. 714/10–13; 700/3; 702/182
See application file for complete search history.

(56) References Cited

U.S. PATENT DOCUMENTS

| | | | |
|---|---|---|---|
| 6,363,453 B1* | 3/2002 | Esposito et al. | 711/2 |
| 6,622,261 B1* | 9/2003 | Laranjeira et al. | 714/11 |
| 6,782,489 B2* | 8/2004 | Fleming | 714/11 |
| 7,539,898 B2* | 5/2009 | Highleyman et al. | 714/13 |
| 2001/0029518 A1* | 10/2001 | Badovinatz et al. | 709/102 |
| 2003/0159083 A1* | 8/2003 | Fukuhara et al. | 714/11 |

* cited by examiner

*Primary Examiner* — Yolanda L Wilson
(74) *Attorney, Agent, or Firm* — Muirhead and Saturnelli, LLC

(57) ABSTRACT

Described are techniques for executing an application on two or more processors. A first portion of one or more modules of the application is determined. A second portion of one or more modules of the application is determined. The first portion of modules is executed on each of the two or more processor. A first of said two or more processor is selected as an active processor. The second portion of modules is executed on the active processor and not on the other ones of said two or more processors.

20 Claims, 14 Drawing Sheets

MASTER-SLAVE PROVIDER ARCHITECTURE AND FAILOVER MECHANISM

CROSS-REFERENCE TO RELATED APPLICATIONS

This application claims priority from U.S. Provisional Application No. 60/853,476, filed Oct. 20, 2006, QUALITY OF SERVICE MANAGER, which is incorporated herein by reference.

BACKGROUND

1. Technical Field

This application generally relates to applications, and more particularly to techniques used in connection with the execution of an application.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data storage systems and servers may be configured in a network arrangement referred to as a Storage Area Network (SAN). Each of the servers may have access to different physical devices, and/or logical portions thereof, included in the SAN. A data storage system may include two processors each executing code. The processors and software executing thereon may operate in accordance with a variety of different models. One existing model is a peer-to-peer model. In such a model, software executing on each of the processors may act as a peer to the other with respect to providing services and performing tasks. Each processor may be capable of providing a same set of services as the other processor such that either processor may service a request received by the data storage system. One problem with the peer-to-peer model is that some tasks performed by the processors may not be well suited for use with the peer-to-peer model.

SUMMARY OF THE INVENTION

In accordance with one aspect of the invention is a method for executing an application on two or more processors comprising: determining a first portion of one or more modules of the application; determining a second portion of one or more modules of the application; executing the first portion of modules on each of the two or more processors; selecting a first of said two or more processor as an active processor; and executing the second portion of modules on the active processor and not on the other ones of said two or more processors. An instance of the application may be executing on each of the two or more processors in a data storage system and the two or more processors service requests in accordance with a peer to peer model in which any of the two or more processors may service an incoming request. A second of the two or more processors may become the active processor, and the method may further comprise executing the second portion of modules on the second of the two or more processors and stopping execution of the second portion of modules on the first processor while the second processor is the active processor. One of the second portion of modules on the active processor may communicate information to the other ones of said two or more processors, said information used by each of said two or more processors for processing requests received while each of said two or more processors do not execute the second portion of modules. The second processor may transition into an active state in connection with becoming the active processor and the first processor may transition into a passive state in connection with stopping execution of the second portion of modules on the first processor. A second of the two or more processors may become the active processor, and the method may further comprise the second processor transitioning into an active state in connection with becoming the active processor when the first processor has an associated status of one of a plurality of statuses including passive, degraded and unknown, wherein degraded represents a degraded processing state. The active processor may transition to a degraded state if a driver used in connection with performing processing for said application is unable to communicate with another driver of one of said two or more processors. The second processor may transition to the active state based on inputs including a previous state of said second processor, a current status of said two or more other processors, and a current status of a driver of the second processor used in connection with communicating with said two or more processors.

In accordance with another aspect of the invention is a data storage system comprising: two or more processors; a communication connection facilitating interprocessor communication among the two or more processors; an incoming communication connection for receiving incoming data requests causing processing to be performed by at least one of said two or more processors; and a computer readable medium comprising executable code stored thereon which is accessible to each of the two or more processors, the computer readable medium including: a first set of one or more executable code modules of an application; a second set of one or more executable code modules of the application, wherein at most one of the two or more processors is an active processor that executes the first set of executable code modules in accordance with a master-slave model and each of the two or more processors executes said second set of executable code modules. The computer readable medium may further include executable code for determining a next state of a processor, said next state being determined in accordance with one or more state transition tables using inputs including: a current state of the processor, a current status of each of the other processors, and a current status of a driver on the processor used for interprocessor communication. The one or more state transition tables may provide for transitioning a processor from a passive state to: a degraded state if a driver on the processor used for interprocessor communication is unable to communicate with other drivers of other processors; an active state if the driver is able to communicate and each of the other processors has an associated status other than active or passive, and wherein a designated one of the two or more processors transitions to the active state if the driver is healthy and each of the two or more processors has an associated status of passive, and otherwise the processor transitions to passive; the passive state if the driver is able to communicate and another one of the processors has an associated active status indicating that the other one of the processors is the active processor. The one or more state transition tables may provide for transitioning a processor from an active state to: the degraded state if a driver on the processor used for interprocessor communication is unable to communicate with other drivers of other processors; the active state if the driver is able to communicate and each of the other processors has an associated status other than active; and one of the active or the passive state if the driver is able to communicate and another one of the processors has an associated active status indicating that the other one of the processors is the active processor. If the driver is able to communicate, a processor may be in the active state and another one of the processors may be in the active state, only a designated one of the two or more processors transitions to the active state. The one or more state transition tables may provide for transitioning a processor from the degraded state to: the degraded state if the driver is not able to communicate; the passive state if the driver is able to communicate and another one of the processors has an associated active status; and the active state if the driver is healthy and each of the other drivers has an associated status other than active.

In accordance with another aspect of the invention is a method for executing two or more applications on a data storage system including at least two processors comprising: determining a first portion of one or more modules of a first application; determining a second portion of one or more modules of the first application; executing on each of the processors an instance of each of the two or more applications, wherein for the first application the first portion of modules executes concurrently on each of the two processors and the second portion of modules executes on a selected one of the processors and not on the other processors at a point in time; executing code on each of the processors that periodically determines whether said each processor is said selected one of the processors. The first application may control I/O processing on the data storage system in accordance with one or more performance goals, and the method may further comprise: receiving an I/O request at the data storage system; and servicing said I/O request by performing processing using any one of the at least two processors. The I/O request may be serviced using the selected one of the processors. The I/O request may be serviced using a processor other than the selected one of the processors. The code that periodically determines whether said each processor is said selected one of the processors may be executed on each of the processors while said each processor services I/O requests, wherein the code determines whether said each processor is the selected one of the processors in accordance with inputs including: a current state of said each processor, a status of the other processors, and a status of a driver on said each processor used for interprocessor communications. One module of the second portion of modules on the selected processor may determine one or more values used in connection with controlling I/O processing, and the method may further comprise: applying the one or more values on the selected processor for use in controlling I/O processing performed by said selected processor; communicating the one or more values to the other processors; and applying, by each of the other processors, said one or more values for use in controlling I/O processing performed by said each processor.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
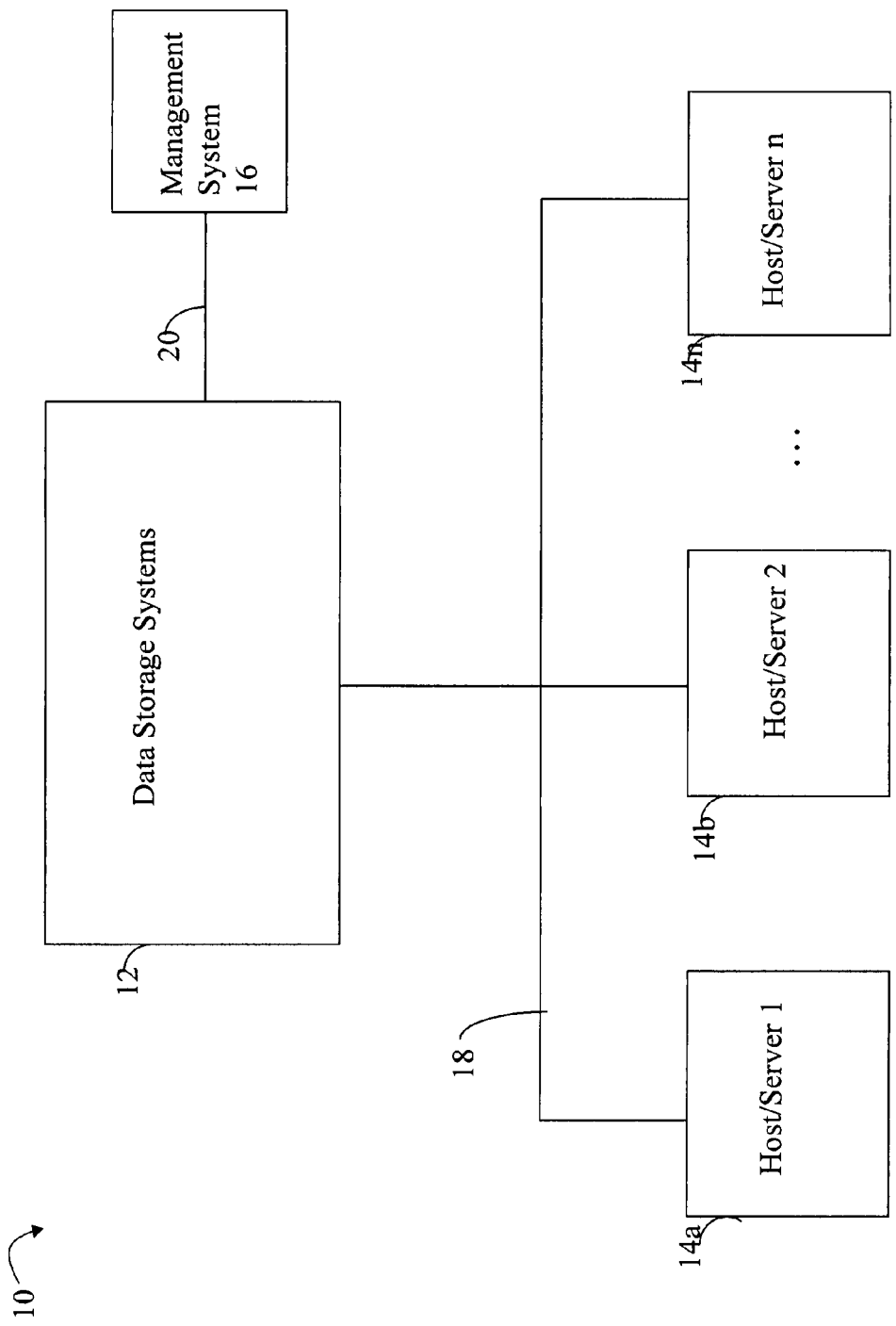
FIG. 1 is an example of an embodiment of a computer system that may utilize the techniques described herein.

Referring now to FIG. 1, shown is an example of an embodiment of a computer system that may be used in connection with performing the techniques described herein. The computer system 10 includes one or more data storage systems 12 connected to host systems 14*a*-14*n* through communication medium 18. The system 10 also includes a management system 16 connected to one or more data storage systems 12 through communication medium 20. In this embodiment of the computer system 10, the management system 16, and the N servers or hosts 14*a*-14*n* may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSCI or Fibre Channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSCI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

Each of the data storage systems may operate stand-alone, or may also be included as part of a storage area network (SAN) that includes, for example, other components such as other data storage systems. One or more data storage systems may also be directly attached to a host for use in connection with the techniques herein rather than in a SAN arrangement. These and other variations will be appreciated by those skilled in the art for use in connection with the techniques herein.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to one of the foregoing logically defined devices or volumes.

The management system 16 may be a workstation serving as a management console and having a web server for connection to one or more of the data storage systems 12. The management system 16 may connect to the data storage systems 12 to use components included on the data storage systems described in following paragraphs for data storage system management functionality. It should be noted that although an embodiment may have a separate management system 16 as illustrated in FIG. 1, the functionality of the management system 16 may be embodied in one of the host systems 14a-14n.

Quality of Service (QOS) software tools may allow users, such as customers, having a data storage system to monitor, measure, and control host-side application performance in accordance with performance goals. Such host-side applications may, for example, execute on a host connected to the data storage system. The techniques herein may be used by tools, such as the QOS software tools, to allow a customer to decide which host-side applications are allocated more of the available system resources of a data storage system. The software tools may include software components executing on the data storage system to monitor, limit and/or set performance goals for such applications issuing I/O requests to the data storage system. The management system 16 may be used to connect to the data storage system to utilize such software components executing thereon.

It should be noted that in the foregoing description in which the QOS tools provide for monitoring, management and control of host-side applications, the QOS tools provide such functionality in the embodiment described herein based on the measured performance of the I/O operations executed on the data storage systems. While some QOS tools are able to monitor host side application performance, the techniques herein provide the functionality by monitoring application performance from the data storage system perspective, not from the host perspective (e.g., by obtaining performance data at the data storage system rather than at the host).

Figure 2:
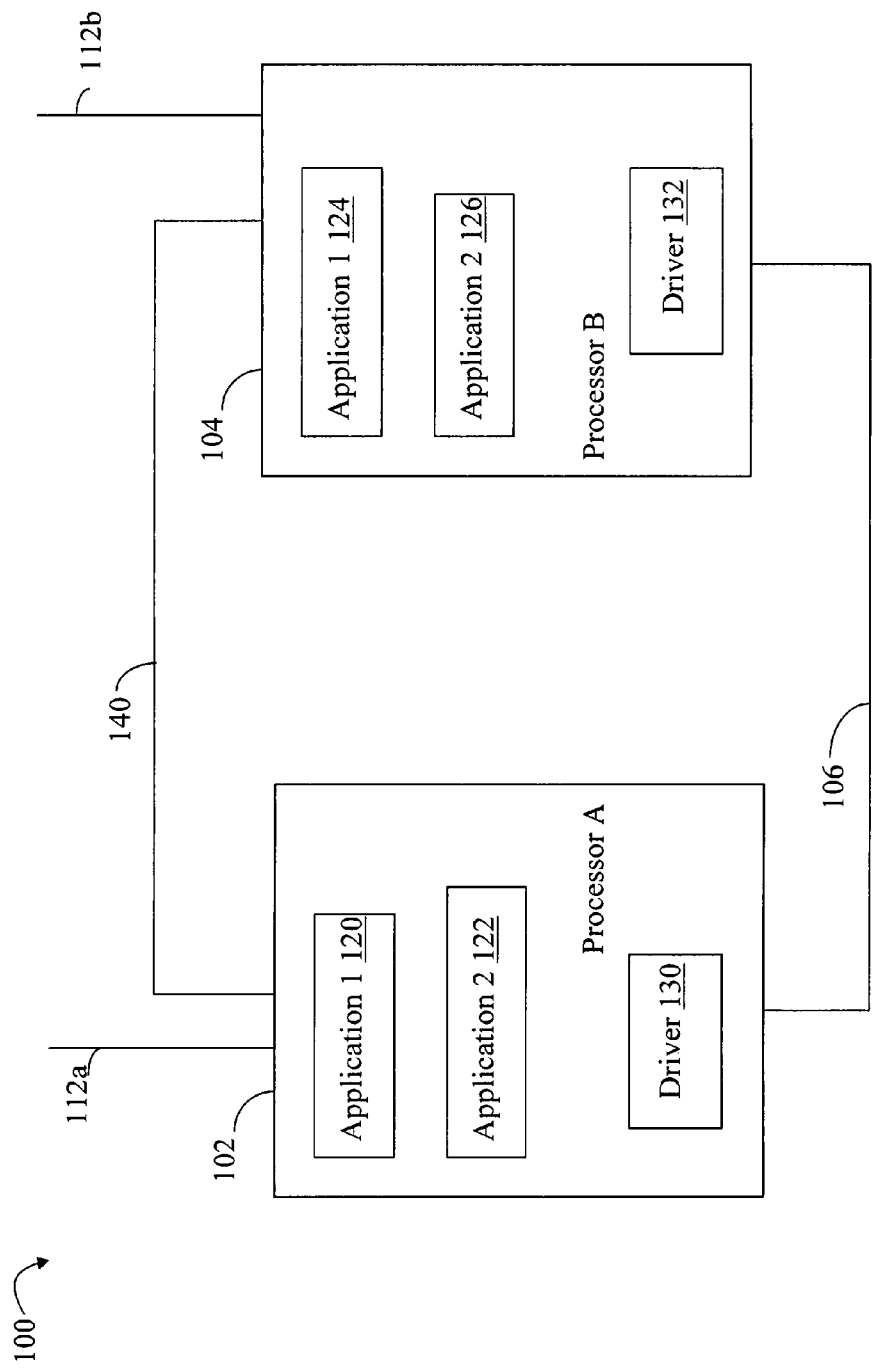
FIG. 2 is an example illustrating components that may be included in a data storage system.

Referring now to FIG. 2, shown is a block diagram of elements that may be included in a data storage system. In the example 100, there are two storage processors 102, 104 although a data storage system may include more than two storage processors. In connection with techniques described herein, the two storage processors may control the operation of the data storage system. The processors may be configured to process data storage requests as received from the hosts, other data storage systems, management system, and other components connected thereto. Each of the processors 102, 104 may process received requests and operate independently and concurrently with respect to the other processor. In the example 100, each processor is illustrated as having one or more components (e.g., application 1, application 2, driver) executing thereon. An embodiment may have a same set of one or more software components executing on each processor so that either of the processors may service a received request. In one embodiment of a peer to peer model for servicing I/O requests, an incoming I/O request may be serviced by any one of the processors. Alternatively, an embodiment may have a different peer to peer model for servicing I/O requests. For example, each processor may be assigned to service incoming I/O requests based on the particular LUN, incoming port, and the like.

The processors 102, 104 and software executing thereon (e.g., application 1, application 2, driver) may operate in accordance with a variety of different models. One existing model that a data storage system may use is a peer-to-peer model. In such a model, software executing on each of the processors 102, 104 may act as a peer to the other with respect to providing services and performing tasks. Each processor may be capable of providing a same set of services as the other processor such that either processor may service a request received by the data storage system.

In one embodiment, one of the applications executing on both processors may be a QOS software application as described above which provides for controlling performance of the data storage system in accordance with performance goals. The QOS software application, as well as other applications, may operate in accordance with a peer to peer model when processing requests in the multi-processor embodiment as illustrated in FIG. 2. However, there may be certain processing operations performed by one of more modules of the QOS application which are not well suited for use with the peer to peer model. In connection with techniques herein, the foregoing one or more modules may operate in accordance with a master-slave or active-passive model with the remaining modules of the same application operating in accordance with a peer to peer model. As will be described in more detail in following paragraphs, the modules of the QOS application may be partitioned into a first portion which operate in accordance with the peer to peer model and a second portion which operate in accordance with the master-slave or active-passive model. In accordance with the master-slave model, only one instance of those modules in the second portion are active at a time so that one of the processors and second portion of modules executing thereon are designated as a "master" with the other processor and second portion of modules thereon designated as the "slave".

It should be noted that as used herein, the terms "active" and "master" may be used interchangeably to refer to the designated active or master processor in the master-slave or active-passive model. Similarly, the terms "slave" or "passive" may be used interchangeably to refer to the one or more processors other than the active or master processor in accordance with the master-slave or active-passive model.

For purposes of illustration, the techniques herein are described with respect to modules of a QOS application on a data storage system with two processors. It will be appreciated by those skilled in the art that the techniques herein may be used in an embodiment with an application other than a QOS application in an environment other than a data storage system in which there are more than two processors. Additionally, the particular components selected for use with each model (e.g., peer to peer and master-slave) may vary with the operations performed by each module.

In the example 100, the application 1 (120, 124) may be the foregoing QOS application. Instances of application 1 executing on processors 102, 104 may communicate over connection 106 using lower-level components, such as drivers 130, 132. The connection 106 may be a bus or other communication connection to facilitate inter-processor communication between the drivers. The processors 102, 104 may also communicate over another connection 140. The connection 140 may be a TCP/IP or other connection over which an instance of application 1 on processor 102 may communication with another instance of application 1 on processor 104. Connection 140 may be used, for example, for application level communications between the processors as well as for communication with one or more components connected to the data storage system. The processors 102, 104 may also receive incoming requests from one or more external components, such as I/O requests from the hosts, over connections 112a and 112b. In one embodiment, the connection 140 may be part of a dedicated LAN connection for management operations. Host I/O requests may be received on different incoming ports such as, for example, Fibre channel or iSCSI ports.

In connection with determining which processor and associated QOS application instance is designated as the master or the slave, one or more different inputs may be considered including the status of a processor's driver, the status of the QOS application on the other processor, and the last state of each processor. Processing may be independently performed by each processor to evaluate the roles of master/active and slave/passive at defined time intervals, for example, such as every 30 seconds. As will be described in following paragraphs, transition tables and state diagrams may be used to represent the designation of master and slave for each processor.

Prior to discussing the processing performed to determine which processor has the master/active role and which has the slave/passive role, the QOS application will be described. Software modules that may be included in the QOS application are functionally described and characterized to provide an example of modules that may operate in accordance with the master-slave model while the remaining modules and services provided by the QOS application, as well as other processing performed by each processor, may be in accordance with the peer to peer model.

The QOS application may use a feedback control technique to achieve goals defined for I/O classes. The I/O class is the logical grouping of I/O requests as received by the data storage system. Received I/O requests may be separated into one or more of the I/O classes. For example, an I/O class may be defined to profile I/O requests associated with a host-side application. Each I/O class may be defined in accordance with one or more attributes. A user may also define a performance goal for each I/O class. In one embodiment, an I/O class representing an application profile may specify attributes including, for example, the LUNs, I/O size(s) and/or I/O type for the application associated with the profile. The purpose of each I/O class is to allow the data storage system to identify the particular application associated with a received I/O request based on the attributes specified for each I/O class. It should be noted that an I/O class may generally correspond to any logical grouping of I/O requests and is not limited to those I/O requests associated with a particular application. For example, a single I/O class may correspond to I/O requests for multiple host applications, I/O requests designated for a particular device independent of host application, a portion of I/O requests of a single application, and the like. A user may specify a particular control method used to meet a goal specified for an I/O class. The control method may indicate the particular algorithm or technique used to regulate the I/O processing. The goal may be specified in terms of a selected metric such as bandwidth, response time, or throughput.

A policy may also be another user defined grouping including all of the I/O classes that are monitored or controlled at a specific time. Only one policy may be run or enforced at a time. A schedule may specify criteria indicating which particular policy is run or enforced at any particular time. For example, a daytime policy may be defined and an off-hours policy may be defined. The daytime policy may be run or enforced during defined daytime working hours. During other times on the weekend and weekdays, the off-hours policy may be run. Once a schedule defining when a particular policy will run is determined, the policy currently scheduled to run may be enforced. The results of running or enforcing a currently active policy may be monitored.

By setting performance goals for I/O classes, users can limit the resources allocated to non-critical applications in order to reduce resource contention between the non-critical applications and other, more critical applications. Performance goals may be used to provide better quality of service (QOS) levels to the critical or more important applications. For example, during overnight hours or other non daytime working hours, a backup application may need to execute and complete a backup. The policy during these overnight hours, may allocate sufficient resources to the backup application in order to ensure the backup completes. At other times, another policy may be enforced which results in the allocation of less resources to any executing backup application, and additional resources allocated to all other applications.

Figure 3:
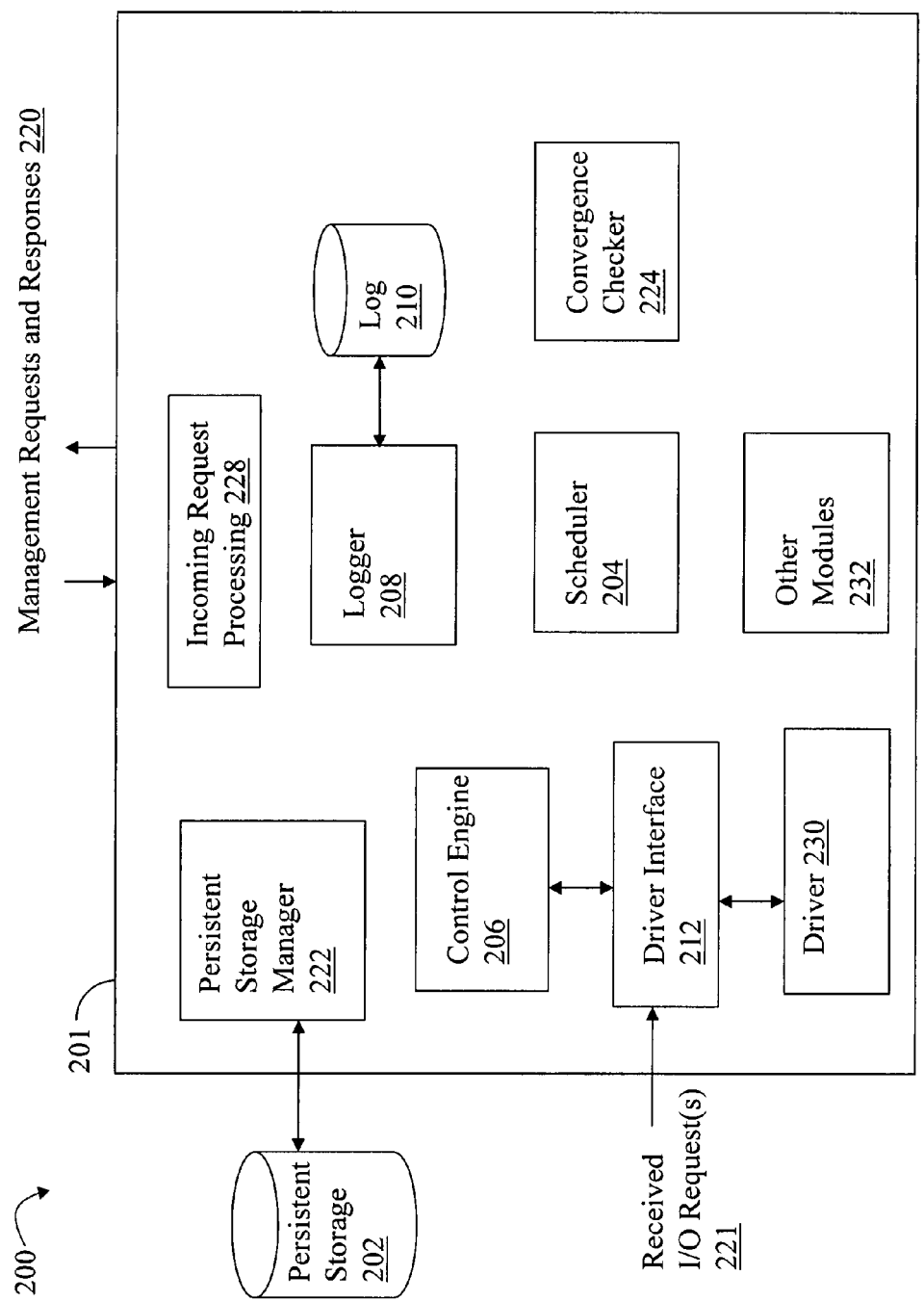
FIG. 3 is an example illustrating components of an application that may be included in each storage processor.

Referring now to FIG. 3, shown is an example of components that may be included in a QOS application 201. The example 200 includes a persistent storage manager 222, incoming request processing module 228, logger 208, log file 210, control engine 206, driver interface 212, driver 230, scheduler 204, convergence checker 224, persistent storage 202, and may also include other modules 232. The QOS application may include a set of the modules or components 222, 206, 212, 230, 228, 208, 210, 204, 232, and 224 that reside and execute on each of the processors 102, 104 of FIG. 1. Each of the processors may persistently store data to the same persistent storage 202 so that information stored by one processor to 202 may be retrieved by any other one of the processors.

Incoming I/O requests 221 may be received and separated into one or more defined I/O classes of the currently running policy by the driver 230 as received by the driver interface 212. In one embodiment, the received I/O requests may be placed in request queues corresponding to the different I/O classes of the currently active policy. The I/O requests may be subsequently retrieved from the queues for processing. It should be noted that after an incoming I/O request has been classified, it may be immediately serviced without having to wait in a queue, for example, if there are no outstanding I/O requests and there are resources available to service the incoming I/O request.

Element 220 may represent management requests and/or responses 220, for example, as may be exchanged between processors of the same data storage system as well as between different data storage systems for performing management functions as those associated with the QOS application described herein. The incoming request processing module 228 may process the incoming management requests of 220 received by the processor.

The control engine 206 may control the processing flow of the QOS application. The control engine 206 may specify initial settings or values affecting the processing rates of the different I/O classes, measure observed or actual performance with the initial settings in effect, and make adjustments to alter the processing rates using the selected control method. The adjustments are made to achieve and/or maintain the goals associated with each I/O class. The control methods operate during enforcement or the running of a policy and may be implemented as executable code. The control engine 206 may communicate with one or more of the components included in the example 200, directly or indirectly, when executing.

The convergence checker 224 may perform processing to determine if performance goals for the I/O classes of the currently running policy have been achieved. The checker 224 may set a flag or other indicator used by the control engine 206 in determining whether to make adjustments. The checker 224 may also determine if there has been a failure to reach the specified goals within a predetermined time period.

The control engine 206 may communicate with driver 230 through driver interface 212. The driver 230 may be characterized as a lower-level component. The driver 230 may facilitate communications over the connection 106 of FIG. 2 such as those with the other processor. The driver 230 may also communicate with one or more other lower level components not illustrated in FIG. 3, for example, to collect performance data when a policy is in force.

In one embodiment as described herein, the driver 230 may also be responsible for performing I/O request classification and placing I/O requests 221 into appropriate queues while awaiting service. The driver 230 may also be responsible for initiating the process of servicing a received I/O request, selecting an I/O request from the one or more queues of outstanding requests, and gathering performance data used in connection with the techniques herein. The driver 230 may communicate with one or more other drivers in an I/O stack of drivers for performing I/O operations.

The logger 208 may write data to the log file 210. In this example, the log file 210 is used to log data collections driven by the control engine 206. The control engine 206 may communicate data to the logger 208 to be stored in the log file 210 at various times while the engine 206 is executing.

The persistent storage manager 222 may be used by one or more of the components to store data persistently in persistent storage 202. For example, as will be described in more detail in connection with the techniques herein, when a master/active processor's instance of the control engine 206 is executing, the engine 206 may communicate with the manager 222 to persistently store data to the persistent storage 202. The data stored may be used to allow the other currently passive processor to become active at a later point in time in connection with the techniques herein. Information that may be persisted may include policy information of the policy currently enforced, current values or settings affecting the processing rates of each I/O class, data used in connection with a currently selected control method allowing another processor to resume execution of the control method, and the like.

The scheduler 204 may be used to define a schedule of one or more policies and to indicate when each of the different policies may be enforced or running.

In connection with techniques herein, one or more of the components included in the QOS application may be selected to operate in accordance with the master-slave model while the remaining components of the QOS application operate in accordance with the peer to peer model. In one embodiment, the control engine 206, the logger 208, and the scheduler 204 of the QOS application may operate in accordance with the master-slave model while the remaining modules may operated in accordance with the peer to peer model. At any point in time, only one instance of the components 206, 208 and 204 are executing on a single processor designated as the active processor. These particular components were selected to operate in accordance with the master-slave model due to the processing operations performed by each component. For example, the scheduler 204 determines the policy currently being enforced on the data storage system affecting both processors A and B and there can only be one running policy at a time. The control engine 206 may execute a selected control method that may make adjustments to settings affecting I/O class processing rates. The same settings are used by both the processors A and B. Since the logger 208 is used to log data collections driven by the control engine 206, the logger 208 in this embodiment only needs to execute when the control engine 206 is executing which runs in accordance with the master-slave model in this embodiment. For this, and other reasons, the embodiment has the logger 208 run in accordance with the master-slave model. If the logger 208 executed in accordance with a peer to peer model, for example, an embodiment may operate so that each logger on each processor creates an identical log consuming additional space, requiring additional communication between processors, and the like.

Other modules of the QOS application as well as other software executed on the data storage system, such as application 2 on each processor, may service received requests and otherwise operate in accordance with the peer to peer model. For example, in connection with the QOS application modules 201, the persistent storage manager 222 or the incoming request processing module 228 may execute on each processor at the same time as opposed to, for example, the control engine 206 which operates in accordance with the master-slave or active-passive model.

The particular components which utilize the master-slave model rather than a peer to peer model may vary with each application and the processing performed by each component.

Figure 4:
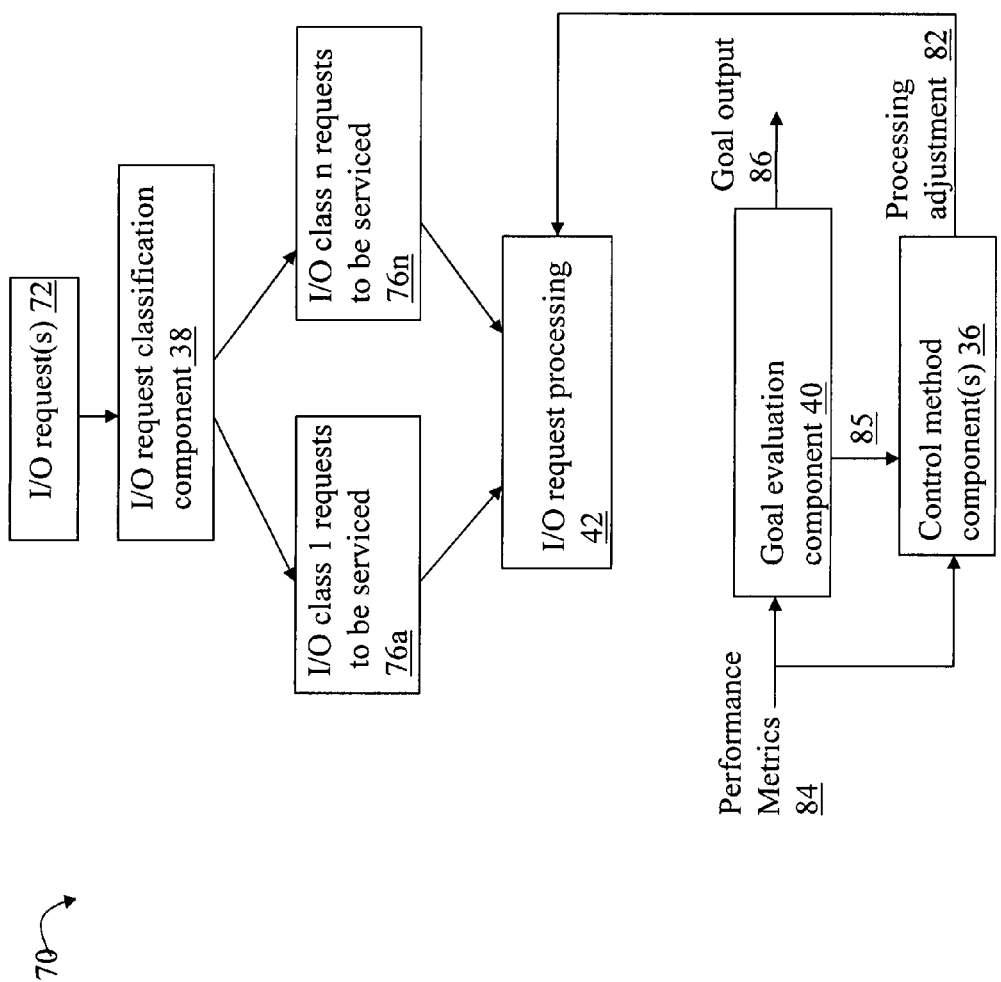
FIG. 4 is an example illustrating the data flow between functional components when a policy is running.

Referring now to FIG. 4, shown is an example illustrating the data flow between various functional components when a policy is running or being enforced. The example 70 illustrates an incoming I/O request 72 received by the data storage system which is input to the I/O request classification component 38 for classification into one of the defined I/O classes (e.g., denoted class 1 76a through class n 76n) for the policy currently being enforced. In this example, the I/O requests waiting to be serviced may be included in a structure, such as a list or other data structure known in the art for each I/O class, while waiting to be serviced by the data storage system. The component 38 performs processing as described in connection with classifying the incoming I/O requests 221 of FIG. 3. I/O request processing 42 selects one or more I/O requests for servicing by the data storage system. The requests selected for processing at various points in time are determined in accordance with the service or performance goals. As will be appreciated by those skilled in the art, any one of a variety of different techniques may be used in connection with initiating service or processing of an I/O request by 42 from one of the queues 76a-76n, or classifying a received I/O request by component 38. One technique that may be used in an embodiment uses interrupts, for example, to signal classification of an I/O request when received, to trigger servicing of an I/O request from a queue at an appropriate time, and the like.

At various points in time, the goal evaluation component 40 may make a determination as to whether the currently specified performance goals are achieved. This may be made by comparing the performance goals previously specified for an I/O class in accordance with current performance metrics 84 measured or observed at the data storage system while a policy including the I/O class is running. As an output, the component 40 may generate a goal output signal 86 indicating whether the current performance goals are being met. The component 40 may perform processing as described in connection with the convergence checker 224 of FIG. 3. The control methods 36 selected for the I/O classes of the policy in force may receive as inputs the current performance metrics 84 measured with the policy enforced, and information 85 from the goal evaluation component 40. The information 85 may include the goals defined for the I/O classes of the policy currently being enforced or running. The control method components 36 may output processing adjustments 82 based on the currently defined performance goals and the current values of the relevant performance metrics 84. The processing adjustments 82 may affect subsequent I/O request processing 42. For example, if a control method for an I/O class includes a value used as a limit, the value may indicate a high watermark as a performance goal which should not be exceeded. In the event that the current performance metric exceeds this value, the corresponding control method component 36 may generate an adjustment 82 causing a decrease in the number of I/O requests of this class processed within a time period. This may be accomplished, for example, by adjusting the priority level of I/O requests of the I/O class relative to other I/O classes defined for the currently executing policy, or some other mechanism to vary the amount of resources of the data storage system allocated for use with a particular I/O class. In one embodiment, varying the number of processes for an I/O class that can be executed concurrently may be used as the mechanism for controlling the resources allocated to servicing I/O requests of a particular I/O class. Other techniques may be utilized by the I/O request processing 42 to apply the adjustments affecting the data storage system resources expended on each I/O class. The goal evaluation may be performed at defined intervals such as when each new set of performance metrics 84 is obtained for the currently executing policy.

The control engine of FIG. 3 may control gathering of the metrics 84 at defined intervals, execution of the selected control method component, and generate any necessary processing adjustment 82. As described above, in order to optimize operation of the data storage system to enable requests of different I/O classes to be processed and meet performance goals, the QOS application may use one or more different techniques to throttle or vary the I/O request processing rate for each I/O class. In one embodiment, the control methods may utilize any one or more different techniques for controlling the I/O processing per I/O class. For example, one embodiment may specify a limit of a number of I/O requests for each I/O class that may execute concurrently. By making adjustments to this limit for an I/O class, the processing rate of the I/O class may be controlled. Any one of a variety of different techniques may be used to determine the amount of adjustments in order to meet a goal specified in terms of a selected metric, such as bandwidth, throughput or response time. One technique that may be used is an algorithm in which the "nth" iteration may utilize previous values from one or more of the previous "n−1" iterations. Information such as the values from the "n−1" or other previous iterations may be persisted by the currently active processor for use by the other processor in the event the other processor assumes the role of the master or active processor.

What will now be described are processing steps that may be performed by the control engine and the scheduler. Subsequently, processing will be described that relates to the master-slave or active-passive model used in connection with operations of the selected modules of the QOS application.

Figure 5:
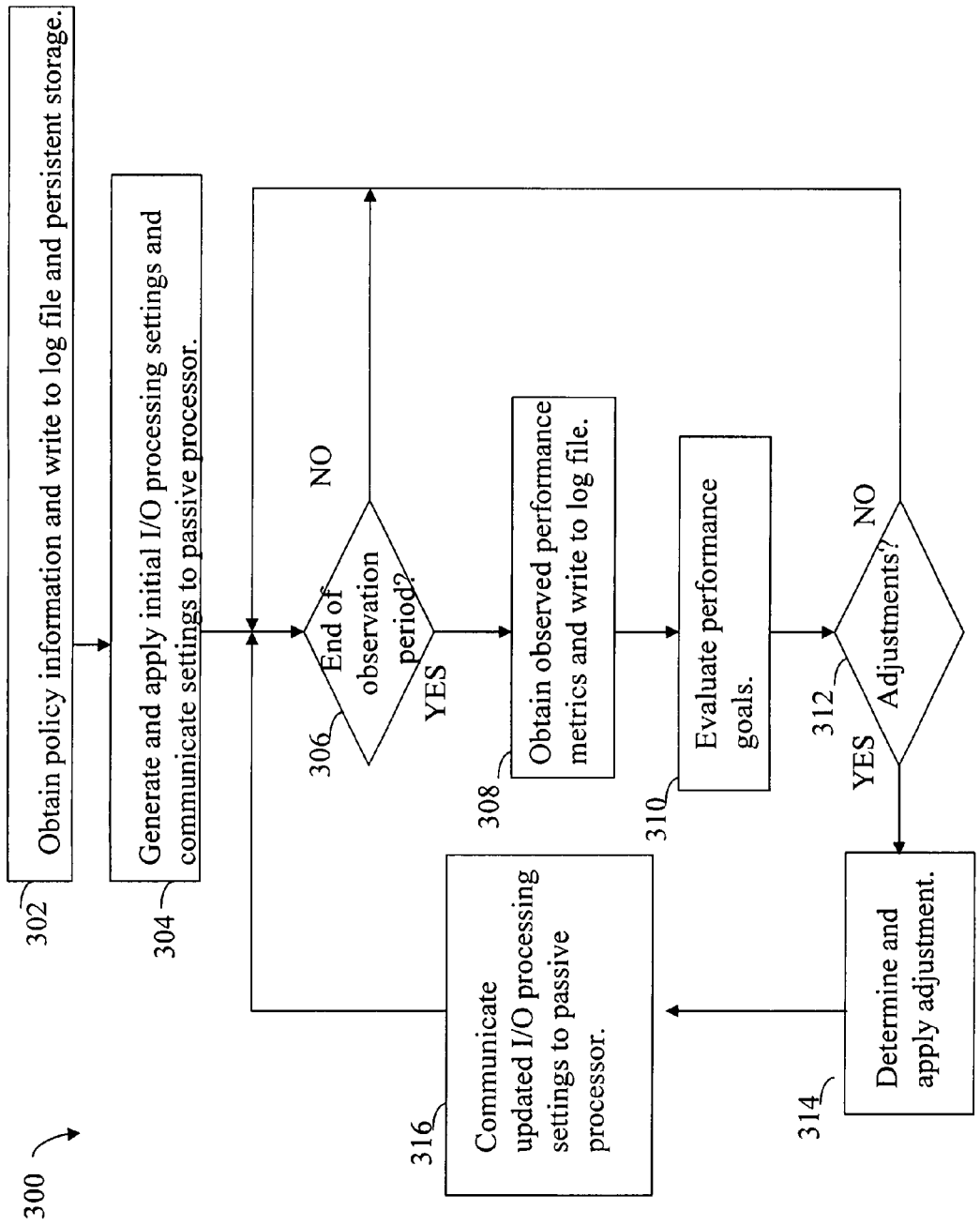
FIG. 5 is a flowchart of processing steps that may be performed by an active or master control engine.

Referring now to FIG. 5, shown is a flowchart of processing steps that may be performed by the control engine. The steps of 300 may be performed by an active or master processor whose control engine is executing. At step 302, information regarding the policy currently being enforced is obtained. The policy information may be obtained, for example, by querying the scheduler for the currently running policy, reading the policy information from a memory location containing current policy information, and the like. The policy information may include the various I/O classes, control method, performance goals for the I/O classes, attributes of each class, and the like. As part of step 302 processing, the policy information may be written to the log file and also be stored to persistent storage. A currently active or master processor may persistently store information (such as the policy information including I/O class information) used by the other processor to subsequently assume the active or master role. At step 304, the control engine may select initial settings for the I/O classes of the currently running policy. The initial settings may control the I/O processing rate for each I/O class. Determination of the initial settings may vary with the selected control method of the currently running policy. The initial settings may specify a value for each I/O class, for example, indicating a maximum number of I/O requests of that class that may be processed concurrently. Once the initial settings have been determined, they are applied for use with the current I/O classes. Additionally, the initial settings may be communicated to the passive processor for use therein in processing requests. The control engine may allow I/O requests to be processed for a time period with the current settings in effect. The time period may be characterized as an observation period. The observation period may be, for example, 20 seconds. At step 306, a determination is made as to whether the observation period has ended. If not, processing waits at step 306 until the observation period has ended. When step 306 evaluates to yes, control proceeds to step 308 to obtain the observed performance metrics. Step 308 obtains the performance data for the current observation period associated with the current settings for each I/O class. Step 308 processing also includes writing the performance data to the log file. It should be noted that step 308 obtains the performance data for both the active and passive processor. In other words, the active processor is responsible for aggregating the performance data for both processors. This is described in more detail in connection with FIG. 13. At step 310, the performance goals are evaluated in light of the currently observed performance metrics. Step 310 processing may include the control engine communicating with the convergence checker to determine if the current performance goals for the I/O classes of the currently executing policy have been met. Step 310 processing may also include determining whether there has been a failure to meet the performance goals within a specified window of time (e.g., if the window of time has lapsed and the performance goals have not been met). At step 312, a determination is made as to whether any adjustment to the current settings affecting the I/O processing is needed. Adjustments may not be needed, for example, if the performance goals have been met or if there has been a failure to meet the current performance goals in a specified time period. It should be noted that in the event of a failure to meet the goals, another module, such as the convergence checker, may cause the control engine to stop. In one embodiment, a user-specified action may occur in response to a policy failure. The user-specified action may result from a previous user selection to either stop executing the current policy, continue running the current policy for a time period, enter a measurement mode, or one or more other options that may be included in an embodiment. In the foregoing, entering measurement mode may cause the QOS application to continue running with no control settings in effect for each I/O class of the currently running policy. In this measurement mode, performance data may continue to be gathered but without specifying any control settings.

If step 312 evaluates to no, control proceeds to step 306 to wait for the end of the next observation period. If step 312 evaluates to yes, control proceeds to step 314 to determine and apply the adjusted settings. Step 314 causes the adjusted settings to become the currently active settings for the I/O classes of the running policy. At step 316, the updated settings are communicated to the other passive processor. Control then proceeds to step 306.

It should be noted that the control engine of the master processor may also persist other information for use by the slave processor should the slave processor subsequently transition from a passive to an active role, for example, if the current master processor fails. The other information may relate to the control method such as sufficient state information to allow a newly active processor to resume control method processing at from the execution point at which the previous master failed. In connection with this latter example, steps 304 and 316 may include also storing the additional state information to persistent storage to allow a newly active processor to resume execution of the control method.

Figure 6:
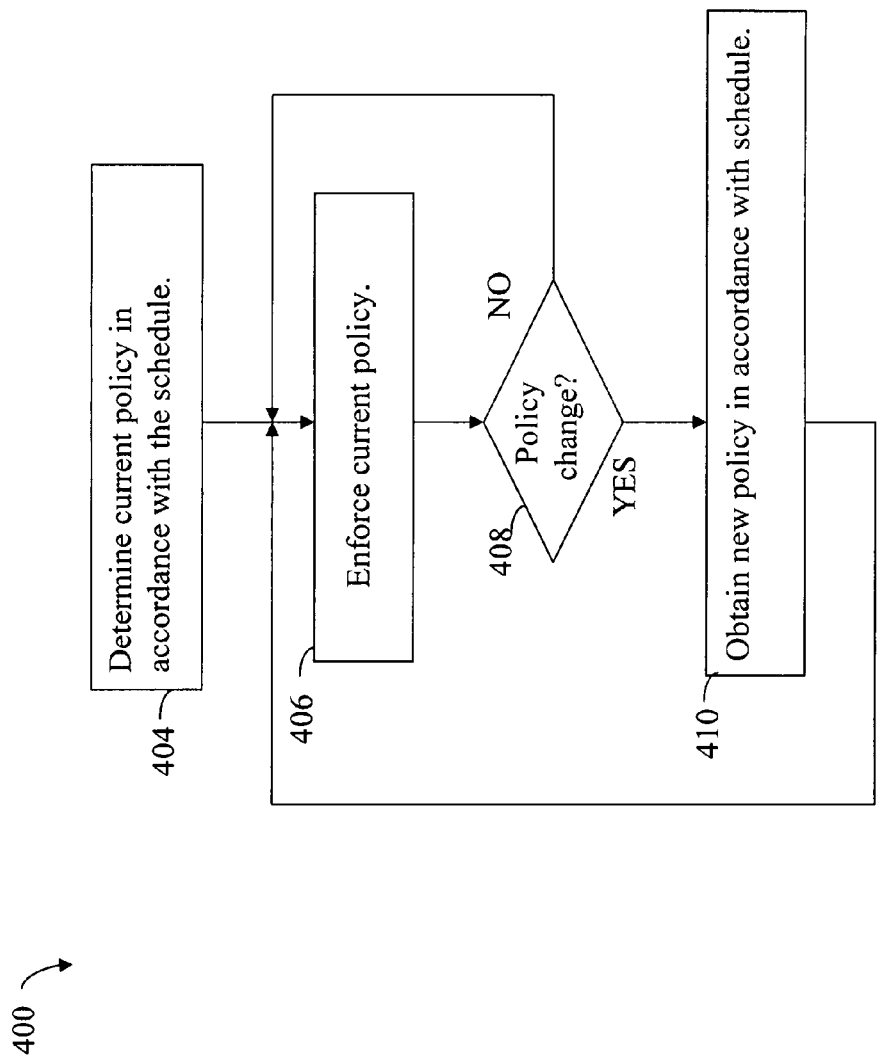
FIG. 6 is a flowchart of processing steps that may be performed by a scheduler.

Referring now to FIG. 6, shown is a flowchart of processing steps that may be performed by the scheduler of the active or master processor. The flowchart 400 performs processing after one or more policies have been created and a schedule has been defined indicating which one of the policies is to be enforced at a particular time. At step 404, a current policy is determined in accordance with the schedule. At step 406, the current policy is enforced. As described herein, the current policy may be enforced in accordance with specified criteria such as for a particular time of day, day of the week, and the like. At step 408, a determination is made as to whether the policy currently being enforced is to be updated. Step 408 may evaluate to yes if a time period specified for a current policy has expired. If step 408 evaluates to no, control proceeds to step 406 to continue enforcing the current policy. If step 408 evaluates to yes, control proceeds to step 410 to obtain a new policy in accordance with the schedule. Control then proceeds to step 406 to enforce the new policy as the current policy. It should be noted that a change to the policy being enforced may cause the control engine to utilize the updated policy. For example, the foregoing change in policy may cause the control engine to be reset so that processing restarts with step 302.

Schedule information regarding the schedule may be stored to persistent storage. Such scheduling information may include criteria specifying how long the current policy is to be enforced. For example, the criteria may include date/time or event information.

The foregoing presents an example of modules of a software application that may operate in accordance with master-slave model in a multi-processor data storage system. Each processor may have a duplicate set of software residing thereon so that an I/O request may be processed by any of the processors. The software modules for one application may be partitioned into those that operate in accordance with the master-slave model and those that operate in accordance with the peer to peer model.

What will now be described is processing that may be performed to determine which processor has the master/active role and which processor has the slave/passive role. As described above in connection with determining which processor and associated QOS application instance is designated as the master or the slave, one or more different inputs may be considered including the status of a processor's driver, the status of the QOS application on the other processor, and the last state of each processor. Processing may be performed by each processor to evaluate the roles of master/active and slave/passive at defined time intervals, for example, such as every 30 seconds. As will be described in following paragraphs, transition tables and state diagrams may be used to represent the designation of master and slave for each processor.

In the embodiment described herein, the QOS application in each processor may be in a state of active, passive or degraded. Each QOS application on each processor may have an initial or start state of passive. The QOS application for a processor determines or transitions to its next state based: the status of the processor's driver (e.g., healthy or unhealthy), the status of the QOS application on the other processor (e.g., active, passive, degraded or unknown) and the current state of the QOS application on the processor (e.g., active, passive or degraded). Each of the foregoing is described in more detail below.

Figure 7:
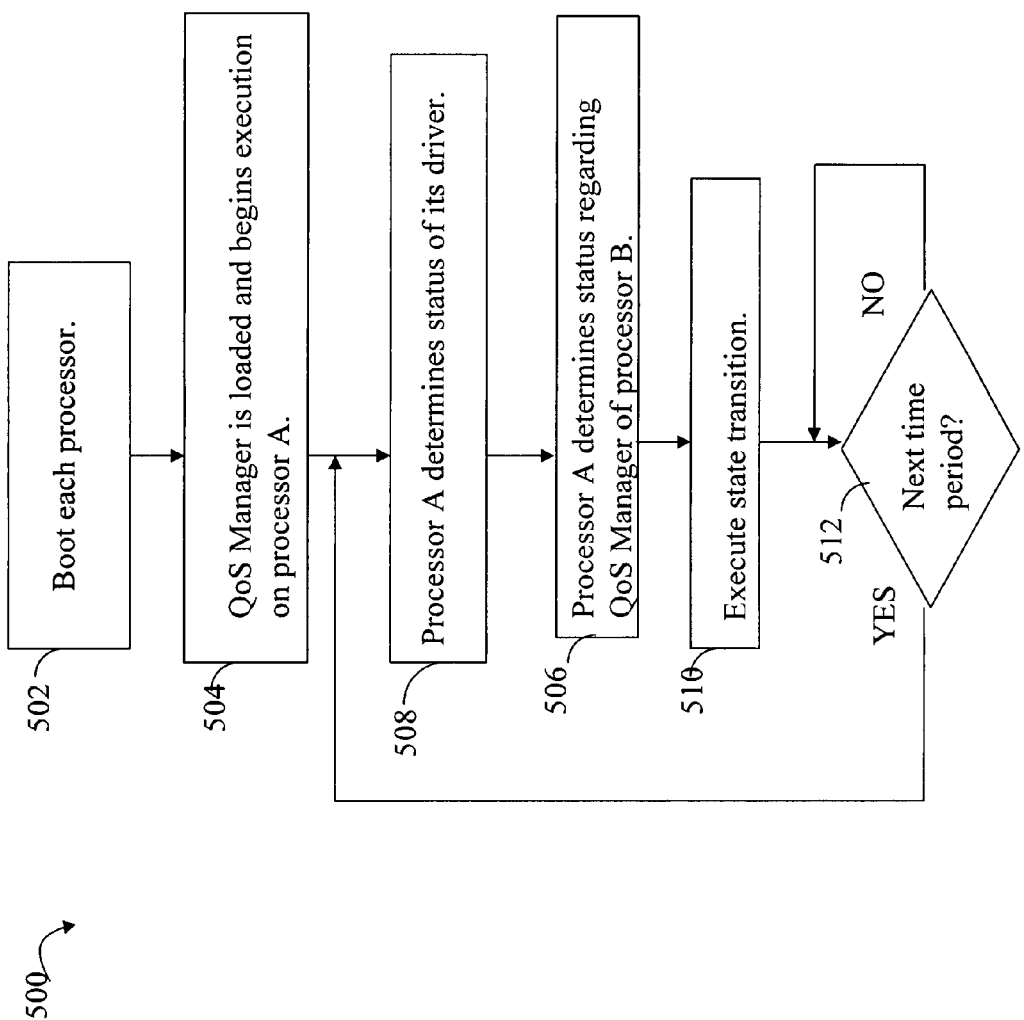
FIG. 7 is a flowchart of processing steps performed by the data storage system using the techniques herein.

Referring now to FIG. 7, shown is a flowchart of processing steps that may be performed when booting up the data storage system. At step 502, each processor commences its initialization or booting procedure. In this example, reference is made to the two processor system of FIG. 2 having processor A and processor B. Subsequent steps of the example 500 are made with reference to processor A although the same processing may also be performed independently with respect to processor B. As part of booting processor A, one or more applications, such as the QOS application, may be loaded and begin execution on processor A in step 504. Once the QOS application is executing on processor A, the application may periodically perform processing of steps 508, 506, 510 and 512 to determine the next state of those components in the QOS application operating in accordance with the master-slave model.

At step 508, the QOS application of processor A determines a status of its own driver, such as driver 130 of FIG. 2. The status of the driver is one of healthy or unhealthy and may be determined based on whether the driver 130 is able to successfully communicate with its peer driver on the other processor. For example, in one embodiment, health of a driver may be determined by sending a message to the peer processor's driver and requesting a reply from the peer driver. If the sending driver successfully receives a reply, the sending driver's status may be healthy, but may be otherwise deemed unhealthy. In this example, the driver status may represent a collective communication status for the sending driver including problems with the driver on processor B, or problems with a bus used to facilitate driver-level communications. It should be noted that a different technique used to determine the health of driver may not depend on the driver of processor B.

At step 506, the QOS application on processor A determines the status regarding the QOS application on processor B. In the embodiment described herein, the status of the QOS application on processor B may be one of: active, passive, degraded or unknown. Step 506 may be performed by determining whether the QOS application executing on processor A is able to communicate at the application level with the QOS application instance on processor B, such as over TCP/IP communication connection 140. Communication between the QOS application instances on processors A and B at the application level may be performed by a user space component of each QOS application instance executing on each processor. Step 506 may include sending a message to the QOS application on processor B requesting that processor B return its current state in a reply message. The status of active, passive, or degraded may reflect the current state of the QOS application as returned from the QOS application executing on processor B. Each QOS application may initialize its own start state to passive. It should be noted that an embodiment may also use other inputs in connection with determining a degraded state of another processor and/or application instance executing thereon. Processor A may determine that processor B is in a degraded state if processor A is able to communicate with processor B but not with the QOS driver of processor B. For example, the QOS driver of processor B may not be loaded and executing but processor B may be up and running. The foregoing may result in a degraded status as may be determined by processor A with respect to processor B in accordance with any error message received in connection with the reply message described above. A status of unknown indicates that the QOS application user space component on processor A is not able to communicate with processor B's QOS application user space component, or that processor B's QOS application user space component is in a corrupted state. The unknown state may be determined, for example, due to a down communication connection or the fact the processor B is offline.

It should be noted that the QOS application as described herein may include one or more components that execute in user address space and one or more components that execute in kernel space depending on the operations performed by each component. An embodiment may include other equivalent execution modes and associated address spaces than as described herein.

It should be noted that an embodiment may associate other conditions and variations as described above with the degraded and unknown status regarding the QOS application on the other processor B. For example, an embodiment may determine that the status of the other processor is active, passive, or degraded based on only the status as returned by processor B in a received reply message. If no reply message is received, the QOS application on processor A may determine that the QOS application on processor B has a status of unknown. In this example, the unknown status may be determined if processor B is online but the QOS application user space component on processor B is not active/able to reply.

Figure 8:
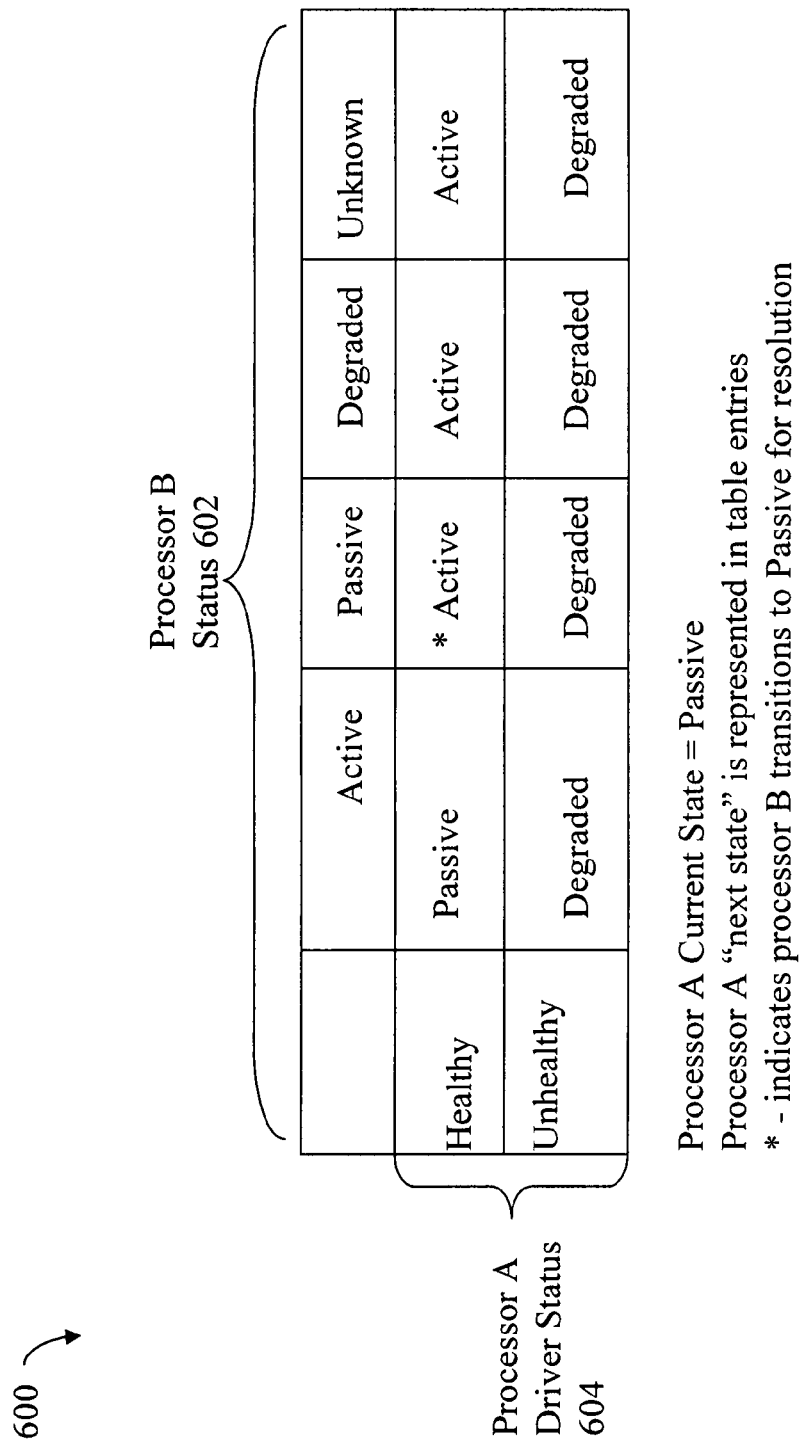
FIGS. 8-10 are tables used in determining a next state of a processor and application components operating in accordance with the master-slave model.
Figure 9:
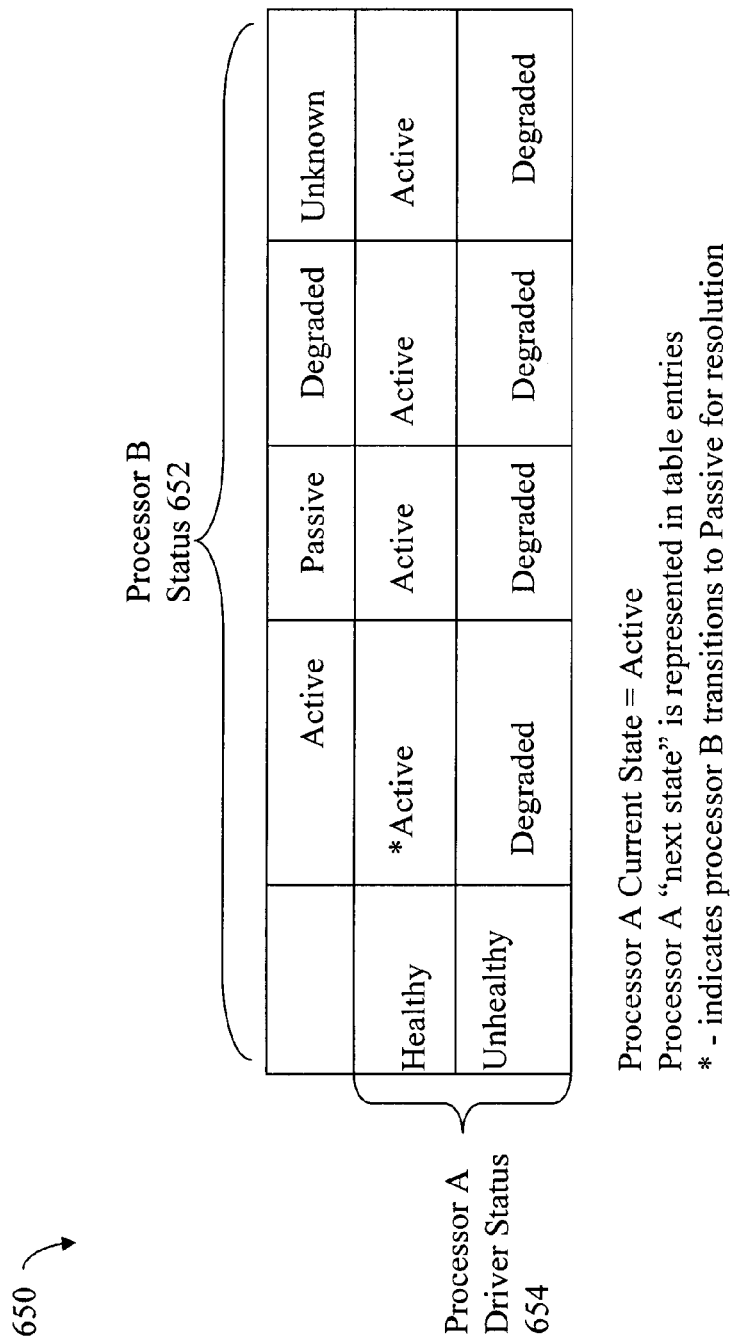
Figure 10:
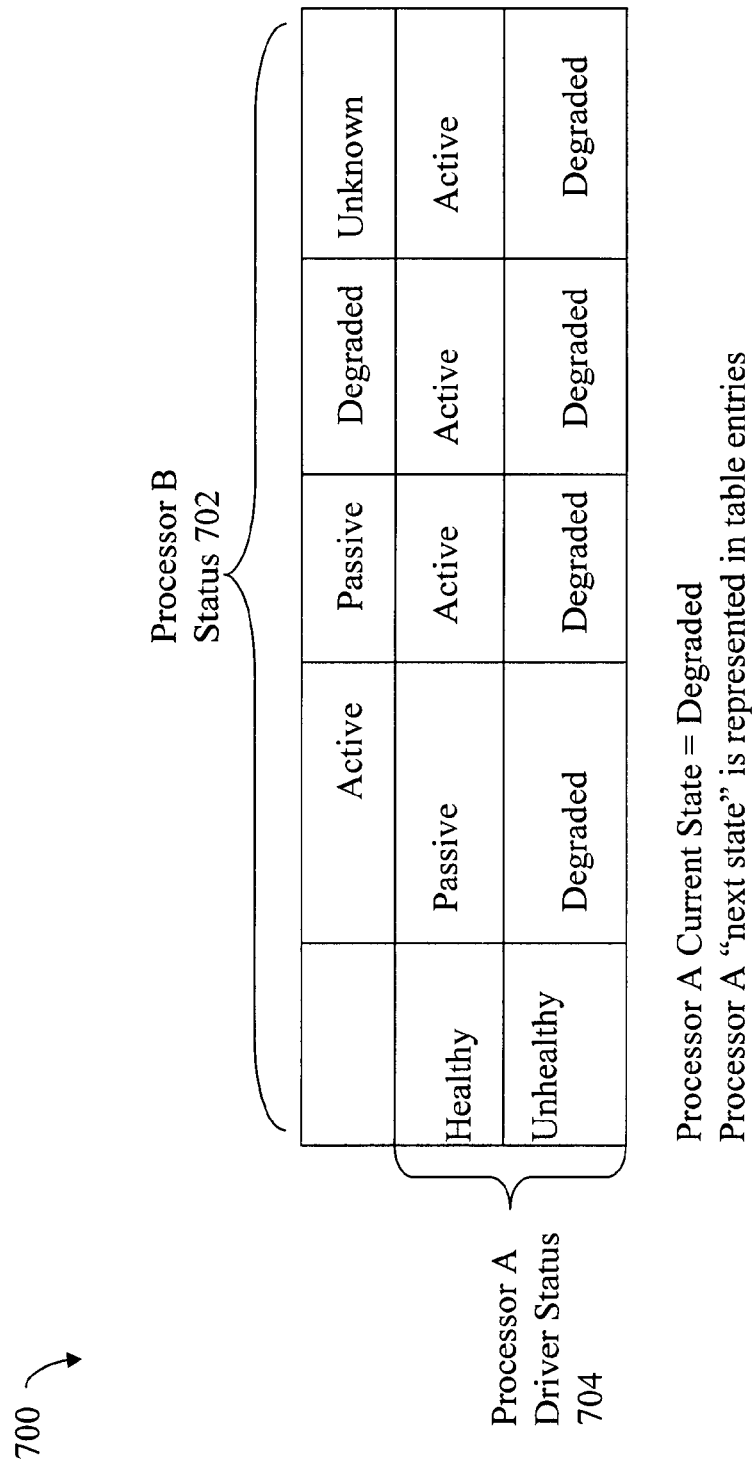

In step 510, processor A executes the state transitions that will be described in more detail in following paragraphs as illustrated in FIGS. 8-10 to determine its next state. Processor A may determine its next state based on 3 inputs: its own current state (e.g., active, passive or degraded), the status of the QOS application on processor B as determined in step 506, and the status of processor A's driver as determined in step 508. Based on the foregoing 3 inputs, processor A determines its next state. Processor A's next state may be one of active, passive or degraded. Detail regarding step 510 is set forth in following paragraphs and figures. From step 510, control proceeds to step 512 where a determination is made as to whether the next time period has passed. If not, control remains at step 512 until step 512 evaluates to yes. If step 512 evaluates to yes, control proceeds to step 508 to determine or transition to the next state.

It should be noted that step 510 may include the processor executing code which performs the state transitions as will now be described in FIGS. 8-10. It should be noted that FIGS. 8-10 represent transition tables with respect to the QOS application of processor A. However, as will be described below, these same tables with minimal modification may also represent the transition tables with respect to the QOS application of processor B.

FIG. 8 is an illustration of the state transition table for determining the next state of the QOS application of processor A when the current state of the QOS application of processor A is passive. The example 600 includes a table with 2 dimensions. Status values for processor A's driver status 604 are indicated in the rows of the table (e.g., healthy, unhealthy). Status values for the QOS application on processor B 602 are indicated as columns of the table (e.g., active, passive, degraded, unknown). An entry in the table 600 corresponding to the next state of processor A is determined based on current values as obtained in steps 506 and 508 of flowchart 500. If the status of processor A's driver is unhealthy, the QOS application of processor A transitions into a degraded state. In this embodiment for the QOS application, if the driver is not healthy, the QOS application is unable to operate properly and considers itself to be in a degraded state even though the QOS application may be executing on the processor A. The foregoing is indicated in the bottom row of the table 600.

It should be noted that a processor and QOS application may determine that its driver is in the unhealthy state if the driver has one or more other conditions indicating that the driver is unable to perform one or more other functions. For example, a processor may determine that its driver is unhealthy due to a condition that renders the driver inoperable (e.g., fatal) or otherwise not fully capable of performing its operations. As an example, a status of unhealthy may be determined by a processor with respect to its driver if the driver is not loaded in kernel space, cannot query its driver interface, and the like.

When processor A's driver is healthy, the QOS application of processor A transitions into the active state if the status value 602 is passive, degraded or unknown. If the status value 602 is active and processor A's driver is healthy, the QOS application of processor A remains in the passive state.

It should be noted that the entry indicated with a "*" in table 600 represents a resolution in the case where both A and B are passive. In such a case, either one, but only one, of A or B transitions to the active state. In the example illustrated in 600, the resolution is that A transitions to the active state and B remains in the passive state. A state transition table for determining the next state of the QOS application of processor B when the current state of the QOS application of processor B is passive is the same as in the example 600 with a modification of the single entry indicated by the "*". In the version of the state transition table 600 for processor B, the "*" entry is passive rather than active.

As a variation to the above resolution case indicated by the "*" entry, an embodiment may alternatively have A remain in the passive state and B transition to the active state. As a result of executing the state transition table of FIG. 8, the first processor to successfully complete the booting process may be in the active state.

FIG. 9 is an illustration of the state transition table for determining the next state of the QOS application of processor A when the current state of the QOS application of processor A is active. The example 650 includes a table with 2 dimensions. Status values for processor A's driver status 654 are indicated in the rows of the table (e.g., healthy, unhealthy). Status values for the QOS application on processor B 652 are indicated as columns of the table (e.g., active, passive, degraded, unknown). An entry in the table 650 corresponding to the next state of processor A is determined based on current values as obtained in steps 506 and 508 of flowchart 500. If the status of processor A's driver is unhealthy, the QOS application of processor A transitions into a degraded state. The foregoing is indicated in the bottom row of the table 650. When processor A's driver is healthy, the QOS application of processor A remains in the active state.

It should be noted that the entry indicated with a "*" in table 650 represents another resolution in the case where both A and B are active. In such a case, one of A or B transitions to the passive state. In the example illustrated in 650, the resolution is that A remains in the active state and B transitions to the passive state. A state transition table for determining the next state of the QOS application of processor B when the current state of the QOS application of processor B is active is the same in the example 650 with the modification of the single entry indicated by the "*". In the version of state transition table 650 for processor B, the "*" entry is passive rather than active.

As a variation to the above resolution case indicated by the "*" entry, an embodiment may alternatively have B remain in the active state and A transition to the passive state.

FIG. 10 is an illustration of the state transition table for determining the next state of the QOS application of processor A when the current state of the QOS application of processor A is degraded. The example 700 includes a table with 2 dimensions. Status values for processor A's driver status 704 are indicated in the rows of the table (e.g., healthy, unhealthy). Status values for the QOS application on processor B 702 are indicated as columns of the table (e.g., active, passive, degraded, unknown). An entry in the table 700 corresponding to the next state of processor A is determined based on current values as obtained in steps 506 and 508 of flowchart 500. If the status of processor A's driver is unhealthy, the QOS application of processor A remains in the degraded state. The foregoing is indicated in the bottom row of the table 700.

When processor A's driver is healthy, the QOS application of processor A transitions into the active state if the status value 702 is passive, degraded or unknown. If the status value 602 is active and processor A's driver is healthy, the QOS application of processor A transitions to the passive state. Based on table 700, when the driver of processor A is healthy, the QOS application on processor A assumes the master or active role as long as the QOS application on processor B does not.

A state transition table for determining the next state of the QOS application of processor B when the current state of the QOS application of processor B is degraded is the same as in the example 700.

Figure 11:
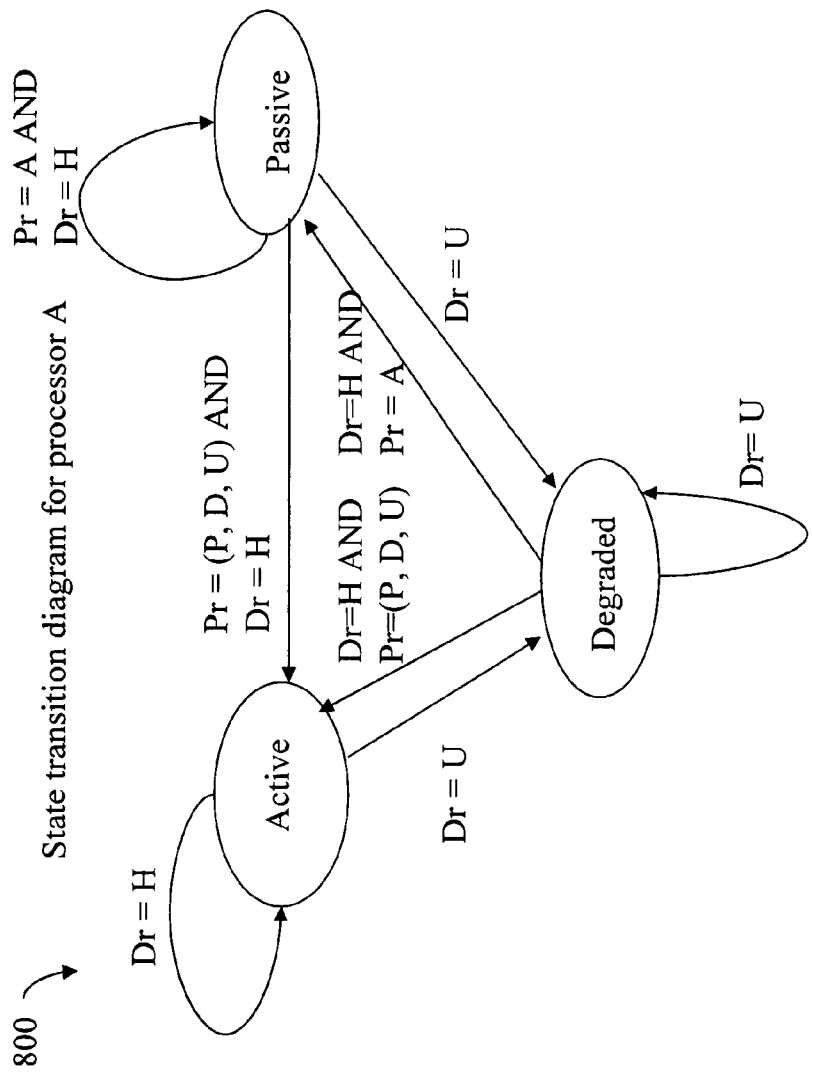
FIGS. 11-12 are state transition diagrams for state determination of a processor and application components operating in accordance with the master-slave model.

Referring now to FIG. 11, shown is a state transition diagram representing the state transitions for the QOS application of processor A. The example 800 is an equivalent representation of the information from the tables of FIGS. 8-10. The example 800 utilizes the following conventions and notations in labeling the transitions.

"Dr=<value>" represents that the status of processor A's driver, wherein <value> is one of "H" for healthy, or "U" for unhealthy.

"Pr=<value>" represents the status of the QOS application on the other processor B, wherein <value> is one of A, P, D, or U corresponding, respectively, to the status values of active, passive, degraded or unknown.

The notation "Pr=<value, . . . , value>" and "Dr=<value, . . . , value>" indicates that any one of the values in the value list <value, . . . , value>" applies to the indicated transition.

The logical connector "AND" is used to represent the logical AND operation of the two conditions. For example, Pr=<P, D, U> AND Dr=H means that the transition applies if the QOS application of processor B is any one of the status values P, D, and U, and the driver of processor A is healthy.

Figure 12:
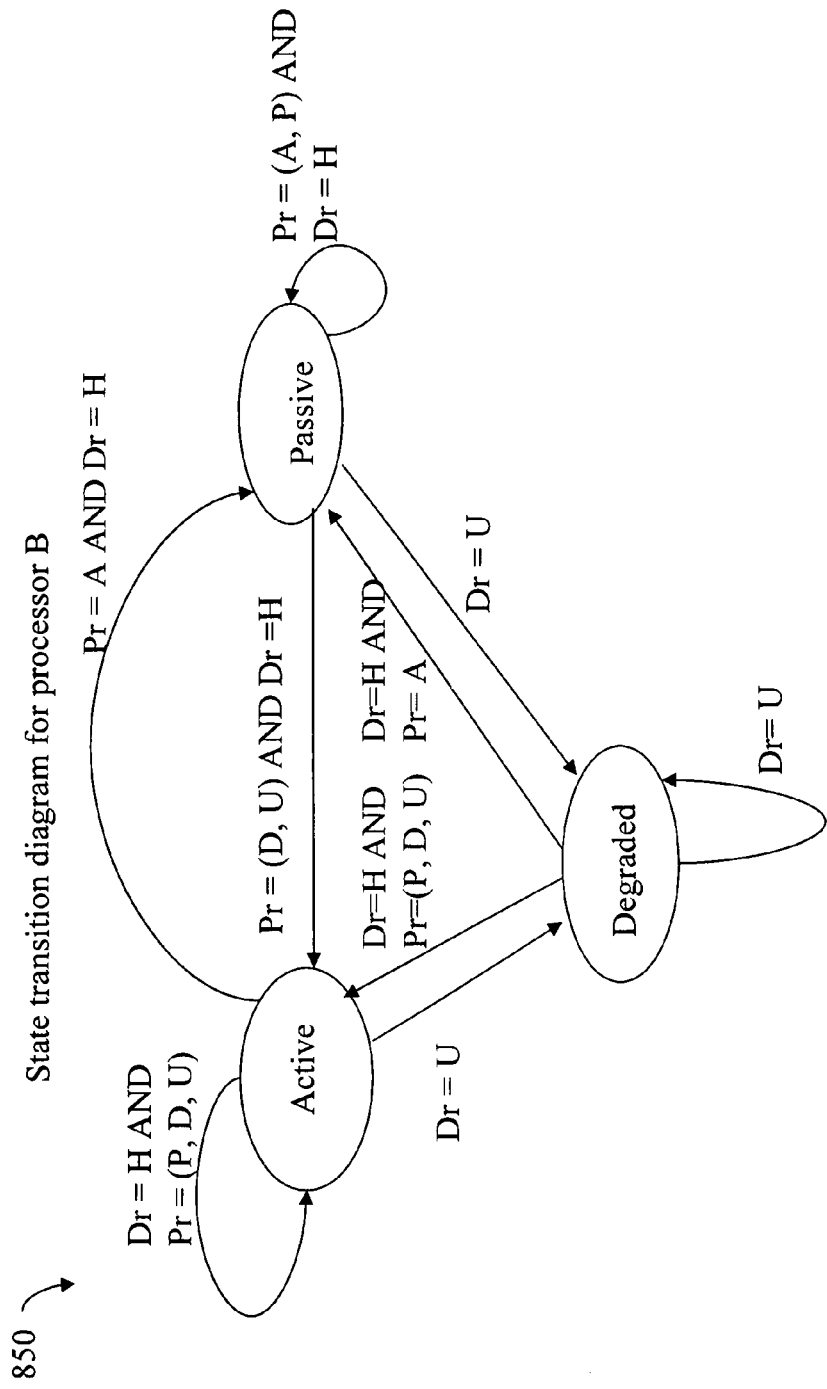

Referring now to FIG. 12, shown is a state transition diagram representing the state transitions for the QOS application of processor B. The example 900 is an equivalent representation of the information from the tables of FIGS. 8-10 with the modifications to the entries of tables 600 and 650 as indicated for the "*" entries described above. The example 900 utilizes the same conventions and notations in labeling the transitions as described for example 800.

FIGS. 11 and 12 are alternative forms to the transition tables for representing the state transitions of the QOS application, respectively, on each of the processors A and B.

Figure 13:
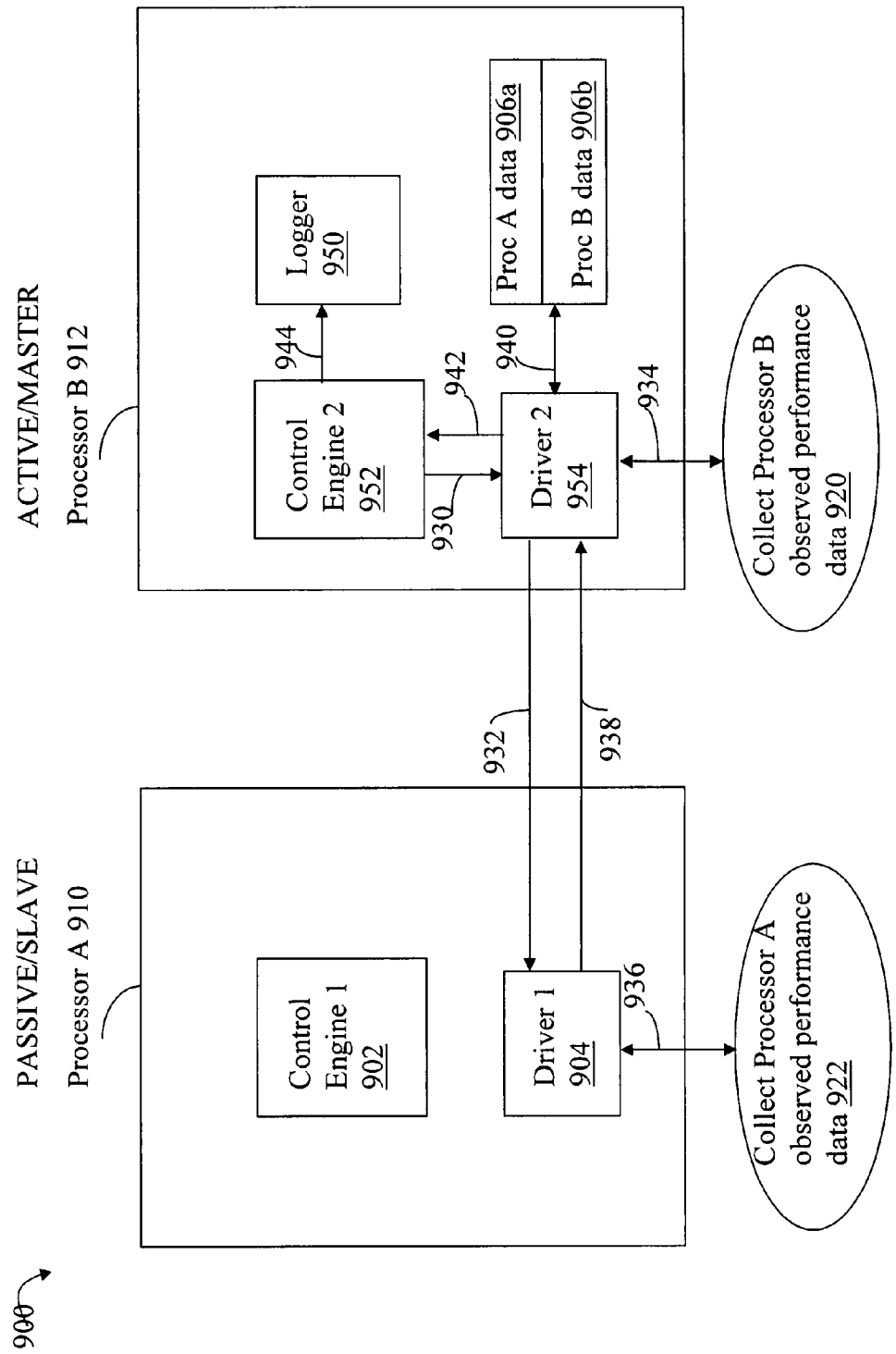
FIG. 13 is an example illustrating data flow in connection with collection of performance data for both processors by a master.

Referring now to FIG. 13, shown is an example illustrating the data flow between an active and passive processor for obtaining performance data as in connection with step 308 of FIG. 5. In the example 900, processor A is the passive processor and B is the active processor. The control engine 2 of processor B is executing the steps of FIG. 5. At step 308, the control engine 2 performs processing to collect the performance data for the next observation period. The control engine 2 may issue a request 930 to the driver 2 to obtain the performance data for both processors A and B. The driver 2 may collect the performance data 920 for processor B by issuing one or more requests indicated by 934. The performance data for processor B is returned to the driver 2. Additionally, the driver 2 issues a request 932 to the driver 1 for the performance data for processor A. The driver 1 obtains 936 the performance data for processor A 922. The performance data for processor A is returned 938 to the driver 2. Driver 2 may store the collected performance data 906a and 906b in a memory buffer location. The collected performance data is then returned 942 to the control engine 2. At this point, the control engine 2 may perform processing on the performance data prior to writing 944 the performance data to the log file via logger 950.

Figure 14:
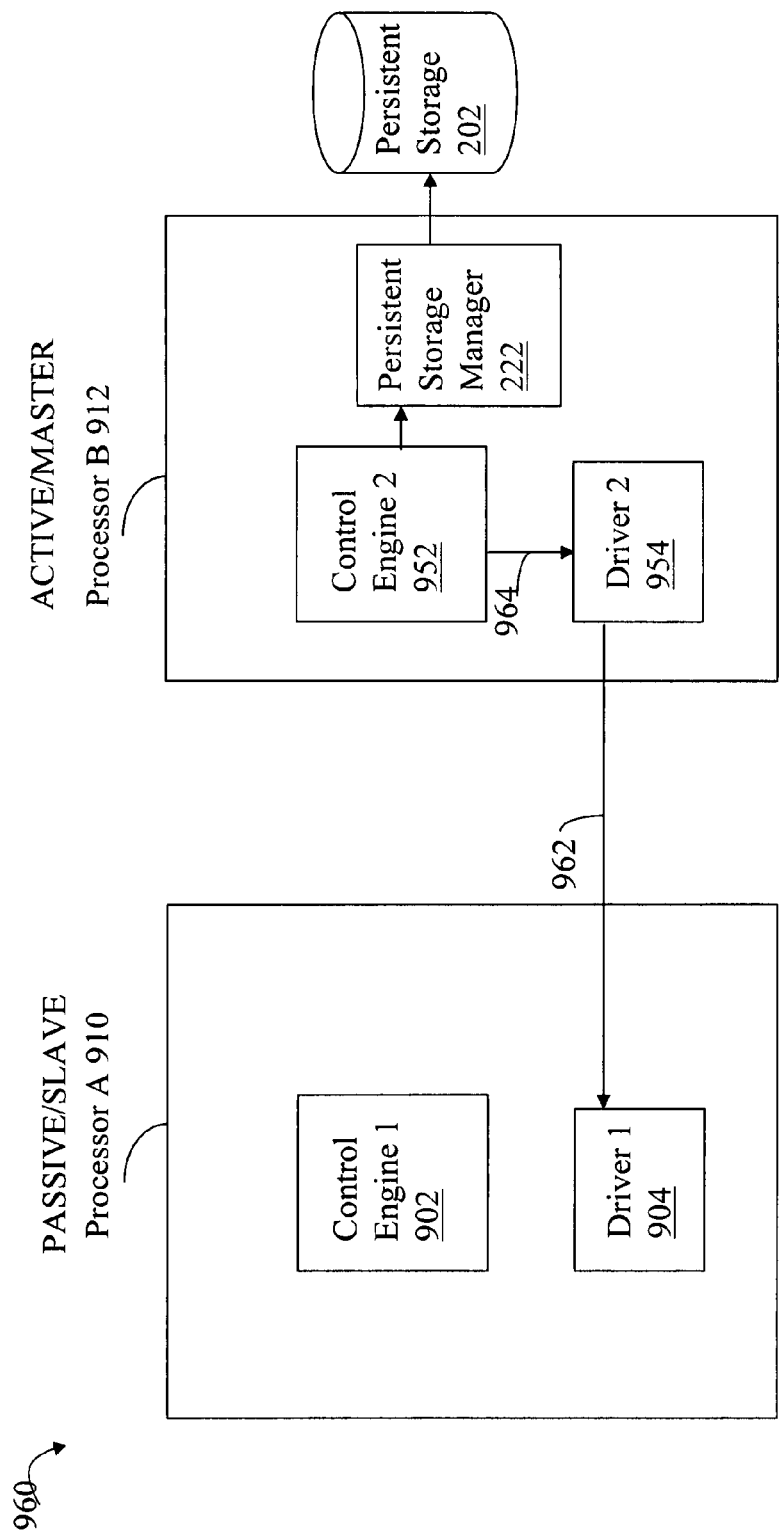
FIG. 14 is an example illustrating data flow in connection with persisting information to storage and communicating information from the master to the slave.

Referring now to FIG. 14, shown is an example illustrating the data flow in connection with the active QOS application writing information to persistent storage and also communicating information to the passive QOS application. As described herein, the active QOS application may determine settings for the I/O classes using a control method. These settings may represent a value for each I/O class indicating how many I/O requests from the particular I/O class may be processed concurrently. Once determined by the active QOS application, these setting may then be pushed from the active to the passive QOS application as illustrated by 962. In the example 960, the active control engine 2 determines the settings for the I/O classes and communicates 964 with the driver 2. The driver 2 then communicates 962 with the driver 1 of the other QOS application on processor A to push the settings for use in connection with processing I/O requests on processor A.

Also illustrated in the example 960 is the active control engine 2 writing data to persistent storage 202. As described herein, the information persisted may include policy and class information (e.g., as written in connection with step 302), schedule information, and possibly other information. The information persisted may vary in accordance with the information that may be used by a processor transitioning from passive to active. The persisted information may also include other information related to the control method. In one embodiment, a processor transitioning into the active state may resume execution of the control method from the point of the previous master. As such, the currently active processor may persistently store sufficient information to allow a subsequently active processor to resume execution. The particular information persisted may vary with the control method selected and cases in an embodiment that trigger the state transition. For example, a state transition may be triggered by a data storage system reboot as well as a problem (e.g., corruption) with the user space component of a QOS application on a processor. Conditions, such as corruption of a user space component of the QOS application, may not allow for certain information to be saved. Alternatively, in another embodiment, the processor transitioning into the active state may not resume execution from the point of the previous master. Rather, the currently active processor may restart execution of the control method without using any prior control setting information related to the control method execution of the previous master.

When transitioning to the active state, a QOS application assumes the role of master and the selected modules of the QOS application become active and are executed. In connection with the example, herein, the selected modules include the control engine, the logger and the scheduler. Additionally, previously persisted information may be obtained for use by the active QOS application. The previously persisted information may include, for example, policy and class information, data used in connection with a currently selected control method allowing another processor to resume execution of the control method, and the like, saved by the previous master. It should also be noted that rather store and retrieve information from persistent storage for use when transitioning to an active state, an embodiment may have the foregoing information communicated from the master to the slave such as using the driver communications illustrated in FIG. 13. In this latter instance the slave and master may have a same copy of the information as provided by the master. If the current master fails, the slave may transition to the master role and use its local copy rather than a copy from persistent storage.

As described herein, a QOS application on a processor may determine an unknown status with respect to the other processor and application. For example, the QOS application on processor A may determine that the QOS application of processor B is unknown. In this case, if processor A's driver is also healthy, processor A may determine that processor B is down and unavailable. Processor A may also take additional steps besides assuming the master role. For example, processor A may notify a user interface component on the management system that the QOS application on processor B is down. The user interface component may then disable operations in connection with the QOS application on processor B until the QOS application on processor B is up and running again. The foregoing may be determined when processor B re-establishes communications with processor A, the management system, and the like.

The techniques herein may be used to dynamically determine a master processor and set of QOS application modules using state transition tables. A processor may transition to an the master role while the data storage system continues to service I/O requests. A processor may transition from the slave role to the master role, for example, if a current master processor or QOS application becomes inoperable or is otherwise unable to perform its master role. In this instance, the slave may transition to the master role in the active state.

The foregoing sets forth an embodiment in which a first portion of selected modules of the QOS application operate in accordance with the master-slave model and the remaining modules of the QOS application as well as other applications on the data storage processor may operate in accordance with another model. In the embodiment herein, the other model is described as the peer to peer model. However, it will appreciated that the remaining modules of the QOS application and/or one or more other applications may operate in accordance with another model, such as the client-server model. In another exemplary embodiment, the QOS application and 2 other applications may reside and execute on the data storage system. The remaining modules of the QOS application may operate in accordance with a peer to peer model. An instance of each of the two other applications may reside and execute on each storage processor of the data storage system. A first of the other applications on the data storage system may operate in accordance with a peer to peer model and a second of the other applications may operate in accordance with a client server.

It will be appreciated by those skilled in the art that the techniques herein are scaleable for use in a data storage or other system with a multiprocessor architecture having more than two processors. In this case, there is a single master in the active state and the remaining processors and applications residing thereon are slaves in the passive state.

In the embodiment described herein, the state transition tables have 3 states and utilize the inputs described herein for determining when to transition between states. An embodiment may also have a different number of states and/or use a different set and number of inputs (e.g., different transition criteria) in determining a next transition.

It should be noted that an embodiment may persist other information for use when a processor assumes the active/master role than as described herein. Various types of configuration information may also be persisted such as, for example, information related to I/O class configuration, policy configuration, schedule task configuration, and other information. For each I/O class, state information may be stored indicating one of the foregoing states: running (e.g., tuning the I/O requests in accordance with performance goal for the I/O class and observed collected performance data), measuring (e.g., collecting performance data only using current control settings with no further ongoing tuning) and idle (e.g., no performance goal or control settings in effect for the I/O class). For a current policy, a persisted state may be one of the following: running and goal achieved, running and trying to achieve performance goal (e.g., tuning settings used to control amount of data storage system resources allocated to I/O classes), currently achieving goal (e.g., performance goal(s) currently met so that observed performance data is within specified performance goals), measuring (e.g., monitoring current performance with no control settings in effect and collect performance data) and idle (e.g., no control settings in effect for I/O classes). For a scheduled task such as in connection with servicing an I/O request, a persisted state may be one of the following: running, scheduled (e.g., scheduled to execute at a particular time or after a defined time period), suspended (e.g., interrupted execution) or broken (e.g., problem with execution of the scheduled task). Persisted information may relate to the particular control method which is active. For example, in one embodiment, a genetic algorithm may be used to determine, for each I/O class, a control setting for the maximum number of I/O requests of the I/O class that may be concurrently serviced. As part of the tuning process to determine the correct number for each I/O class, information regarding one or more previous solutions may be saved and used to reduce the set of solutions/solution space examined in the next execution. The persisted information for a control method may also indicate whether a selected option is in effect to enable/disable use of such previous solutions.

In an embodiment in which a first QOS application of a first processor transitions to the active state from the passive state due to a second instance of the QOS application user space component terminating on a second (e.g., active) processor, the first QOS application may determine the current policy such as by reading it from one of the first processor's memory locations. The first QOS application may then start execution of its control engine, run the current policy, and then start execution of its logger and scheduler components. The policy configuration information as may be obtained from the persistent storage may indicate what operations are performed by the control engine of the first QOS application. For example, if the genetic algorithm is the currently selected control method and adjustments or tuning of the control settings for the I/O classes are being performed, the previously stored solution sets may be obtained for use if this option has been enabled.

It should be noted that in the case where the foregoing first QOS application transitions to the active state from a degraded due to the first storage processor recovering from a prior crash or reboot, the control engine of the first QOS application may read information regarding the current or last running policy from persistent storage rather than memory local to the first processor and continue as described above when transitioning from the passive state.

It should be noted that an embodiment may use other criteria than as described herein for defining a degraded state. The particular criteria used may vary with the operation(s) performed by the application, such as the QOS application described herein. A condition that represents a processor and associated QOS application currently being unable to perform its designed function may cause the processor and QOS application to be designated as being degraded. For example, if a first module performed operations based on a statistical analysis of data, and at some point in time there was insufficient data available to perform a valid analysis (e.g. perhaps there is a problem with a data collection module or other hardware and/or software problem inhibiting sufficient data collection), the processor upon which the first module executes may be deemed to be in a degraded state.

In one embodiment of the QOS application as described herein, a processor executing a QOS application may determine that it is in a degraded state if one or more core components, such as the driver or other component, is not properly loaded, in a corrupted or other state which does not allow it to perform its function in connection with the QOS application. A processor transitioning to the active state may not be able to access persistent storage in order to obtain persisted information. The QOS application on the processor may determine it is in a degraded state and continue to try to access persistent storage. In an embodiment which may implement version checking between different components of the QOS application executing on each processor, a version incompatibility or mismatch, such as between the driver and the control engine, may cause the QOS application to determine it is in a degraded state while, for example, it tries to locate and load a proper version of a driver.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for executing an application on two or more processors comprising:
    determining a first portion of one or more modules of the application;
    determining a second portion of one or more remaining modules of the application not included in said first portion;
    executing the first portion of modules on each of the two or more processors;
    selecting a first of said two or more processors as an active processor; and
    executing the second portion of modules on the active processor and not on the other ones of said two or more processors which are designated as passive processors with respect to said second portion of modules, wherein said two or more processors are included in a same system wherein the application is a quality of service application that controls performance of the system for a plurality of I/O classes of I/O requests in accordance with performance goals including an I/O request processing rate for each of the I/O classes said first portion of modules including a control engine that executes only on said active processor and adjusts, to obtain the performance goals, one or more values used by each of the two or more processors in connection with controlling resources allocated to servicing received I/O requests of each of the I/O classes.

2. The method of claim 1, wherein an instance of the application is executing on each of the two or more processors in a data storage system and the two or more processors service requests in accordance with a peer to peer model in which any of the two or more processors may service an incoming request.

3. The method of claim 1, wherein a second of the two or more processors becomes the active processor, and the method further comprising:
    executing the second portion of modules on the second of the two or more processors and stopping execution of the second portion of modules on the first processor while the second processor is the active processor.

4. The method of claim 1, wherein one of the second portion of modules on the active processor communicates information to the other ones of said two or more processors, said information used by each of said two or more processors for processing requests received while each of said two or more processors do not execute the second portion of modules.

5. The method of claim 3, wherein the second processor transitions into an active state in connection with becoming the active processor and the first processor transitions into a passive state in connection with slopping execution of the second portion of modules on the first processor.

6. The method of claim 1, wherein a second of the two or more processors becomes the active processor, and the method further comprising:
    the second processor transitioning into an active state in connection with becoming the active processor when the first processor has an associated status of one of a plurality of statuses including passive, degraded and unknown, wherein degraded represents a degraded processing state.

7. The method of claim 1, wherein the active processor transitions to a degraded state if a driver used in connection with performing processing for said application is unable to communicate with another driver of one of said two or more processors.

8. The method of claim 6, wherein the second processor transitions to the active state based on inputs including a previous state of said second processor, a current status of said two or more other processors, and a current status of a driver of the second processor used in connection with communicating with said two or more processors.

9. A data storage system comprising:
    two or more processors;
    a communication connection facilitating interprocessor communication among the two or more processors;
    an incoming communication connection for receiving incoming data requests causing processing to be performed by at least one of said two or more processors; and
    a non-transitory computer readable medium comprising executable code stored thereon which is accessible to each of the two or more processors, the non-transitory computer readable medium including:
        a first set of one or more executable code modules of an application;
        a second set of one or more remaining executable code modules of the application not included in said first portion, wherein at most one of the two or more processors is an active processor that executes the first set of executable code modules in accordance with a master-slave model with others of said two or more processors designated as passive or slave processors with respect to the first set of executable code modules and each of the two or more processors executes said second set of executable code modules, wherein the application is a quality of service application that controls performance of the data storage system for a plurality of I/O classes of I/O requests in accordance with performance goals including an I/O request processing rate for each of the I/O classes said first set of executable code modules including a control engine that executes only on said active processor and adjusts, to obtain the performance goals, one or more values used by each of the two or more processors in connection with controlling resources allocated to servicing received I/O requests of each of the I/O classes.

10. The system of claim 9, wherein said non-transitory computer readable medium further includes:
executable code for determining a next state of a processor, said next state being determined in accordance with one or more state transition tables using inputs including: a current state of the processor, a current status of each of the other processors, and a current status of a driver on the processor used for interprocessor communication.

11. The system of claim 10, wherein the one or more state transition tables provide for transitioning a processor from a passive state to:
a degraded state if a driver on the processor used for interprocessor communication is unable to communicate with other drivers of other processors;
an active state if the driver is able to communicate and each of the other processors has an associated status other than active or passive, and wherein a designated one of the two or more processors transitions to the active state if the driver is healthy and each of the two or more processors has an associated status of passive, and otherwise the processor transitions to passive;
the passive state if the driver is able to communicate and another one of the processors has an associated active status indicating that the other one of the processors is the active processor.

12. The system of claim 10, wherein the one or more state transition tables provide for transitioning a processor from an active state to:
the degraded state if a driver on the processor used for interprocessor communication is unable to communicate with other drivers of other processors;
the active state if the driver is able to communicate and each of the other processors has an associated status other than active; and
one of the active or the passive state if the driver is able to communicate and another one of the processors has an associated active status indicating that the other one of the processors is the active processor.

13. The system of claim 12, wherein if the driver is able to communicate, a processor is in the active state and another one of the processors is in the active state, only a designated one of the two or more processors transitions to the active state.

14. The system of claim 12, wherein the one or more state transition tables provide for transitioning a processor from the degraded state to:
the degraded state if the driver is not able to communicate;
the passive state if the driver is able to communicate and another one of the processors has an associated active status; and
the active state if the driver is healthy and each of the other drivers has an associated status other than active.

15. A method for executing two or more applications on a data storage system including at least two processors comprising:
determining a first portion of one or more modules of a first application;
determining a second portion of one or more remaining modules of the first application not included in said first portion;
executing on each of the at least two processors an instance of each of the two or more applications, wherein for the first application the first portion of modules executes concurrently on each of the at least two processors and the second portion of modules executes on a selected one of the at least processors designated as an active processor and not on the others of the at least two processors designated as passive processors at a point in time; and
executing code on each of the processors that periodically determines whether said each processor is said selected one of the at least two processors, wherein the at least two processors are included in a same data storage system, wherein the first application is a quality of service application that controls performance of the data storage system for a plurality of I/O classes of I/O requests in accordance with performance goals including an I/O request processing rate for each of the I/O classes, said second portion of modules including a control engine that executes only on said active processor and adjusts, to obtain the performance goals, one or more values used by each of the two or more processors in connection with controlling resources allocated to servicing received I/O requests of each of the I/O classes.

16. The method of claim 15, the method further comprising:
receiving an I/O request at the data storage system; and
servicing said I/O request by performing processing using any one of the at least two processors.

17. The method of claim 16, wherein the I/O request is serviced using the selected one of the at least two processors.

18. The method of claim 16, wherein the I/O request is serviced using a processor other than the selected one of the at least two processors.

19. The method of claim 16, wherein the code that periodically determines whether said each processor is said selected one of the at least two processors executes on each of the processors while said each processor services I/O requests, wherein the code determines whether said each processor is the selected one of the at least two processors in accordance with inputs including: a current state of said each processor, a status of the other processors, and a status of a driver on said each processor used for interprocessor communications.

20. The method of claim 15, wherein each of the I/O classes is defined using one or more attributes associated with received I/O requests of an application sending the received I/O requests, the I/O classes are used by the data storage system to identify an application that sent an I/O request received by the data storage system, a first performance goal for a first of the I/O classes is a first I/O request processing rate, and the active processor performs processing including:
collecting current performance data regarding I/O processing for the I/O classes each of the at least two processors;
evaluating whether the current performance data indicates that the performance goals for the plurality of I/O classes are met; and
in response to determining that the first performance goal for the first I/O class is not met, adjusting a first of the one or more values for the first I/O class that results in varying an I/O request processing rate for the first I/O class, said first value being adjusted by an amount in accordance with the first performance goal.

* * * * *